US012526387B2

(12) United States Patent
Madbak et al.

(10) Patent No.: US 12,526,387 B2
(45) Date of Patent: Jan. 13, 2026

(54) SYSTEMS AND METHODS FOR MANAGING AUDIO INPUT DATA AND AUDIO OUTPUT DATA OF VIRTUAL MEETINGS

(71) Applicant: Adeia Guides Inc., San Jose, CA (US)

(72) Inventors: Hanna Madbak, Fort Lee, NJ (US); Andrew M. Sills, Bloomington, IN (US); Ning Xu, Irvine, CA (US); Kyle Beckemeyer, Park Ridge, IL (US); Mathew Adams, Matthews, NC (US)

(73) Assignee: Adeia Guides Inc., San Jose, CA (US)

( * ) Notice: Subject to any disclaimer, the term of this patent is extended or adjusted under 35 U.S.C. 154(b) by 231 days.

(21) Appl. No.: 18/528,383

(22) Filed: Dec. 4, 2023

(65) Prior Publication Data
US 2025/0184448 A1   Jun. 5, 2025

(51) Int. Cl.
*H04N 7/15* (2006.01)
*H04N 7/14* (2006.01)

(52) U.S. Cl.
CPC ............. *H04N 7/157* (2013.01); *H04N 7/147* (2013.01); *H04N 7/152* (2013.01)

(58) Field of Classification Search
CPC ......... H04N 7/157; H04N 7/147; H04N 7/152
See application file for complete search history.

(56) References Cited

U.S. PATENT DOCUMENTS

| | | | |
|---|---|---|---|
| 7,978,838 B2 | 7/2011 | Rodman et al. | |
| 8,199,927 B1 | 6/2012 | Raftery | |
| 8,265,292 B2 | 9/2012 | Leichter | |
| 8,717,403 B1 | 5/2014 | Kalevo et al. | |
| 9,154,730 B2 | 10/2015 | Lee et al. | |
| 10,142,484 B2 | 11/2018 | Spittle et al. | |
| 10,791,153 B2 | 9/2020 | Bryans et al. | |
| 11,032,675 B2 | 6/2021 | Ylönen et al. | |
| 11,107,490 B1 | 8/2021 | Slotznick | |
| 11,665,392 B2 | 5/2023 | Chandrashekar et al. | |

(Continued)

OTHER PUBLICATIONS

HP, Inc., "A Method for Enhancing Legacy Acoustic Echo Cancellation by Echo Prediction", (Technical Disclosure Commons, Defensive Publications Series), (Jun. 2023), (https://www.tdcommons.org/cgi/viewcontent.cgi?article=7067&context=dpubs_series).

(Continued)

*Primary Examiner* — Amal S Zenati
(74) *Attorney, Agent, or Firm* — HALEY GUILIANO LLP

(57) ABSTRACT

Systems, methods and apparatuses are described for managing audio data received from users during a virtual meeting. First and second users, co-located at a particular location, may be participating in the virtual meeting via a first and second computing devices. Third and fourth users, remotely located from the particular location, may be participating in the virtual meeting via one or more computing devices. A first intermediate audio stream corresponding to the detected voice of the third user and a second intermediate audio stream corresponding to the detected voice of the fourth user may be generated. First and second audio output streams may be generated based on the first and second intermediate audio streams. During the virtual meeting, the first audio output stream may be output by the first computing device and the second audio output stream may be output by the second computing device.

20 Claims, 9 Drawing Sheets

(56) References Cited

U.S. PATENT DOCUMENTS

| | | | |
|---|---|---|---|
| 2015/0249885 A1 | 9/2015 | Kawabata | |
| 2015/0371658 A1 | 12/2015 | Gao | |
| 2020/0322723 A1* | 10/2020 | Sinkov | H04R 3/005 |
| 2022/0303502 A1* | 9/2022 | Fisher | H04L 65/1083 |
| 2022/0319530 A1 | 10/2022 | Moravy et al. | |
| 2023/0107968 A1 | 4/2023 | Trivedi et al. | |
| 2025/0193625 A1* | 6/2025 | Jia | H04S 3/008 |

OTHER PUBLICATIONS

James Reilly, "Blind Source Separation" (McMaster University, Engineering), (https://www.ece.mcmaster.ca/~reilly/bss.html), (2 pages).

Shoko Araki, "Blind Speech Separation in a Meeting Situation with Maximum SNR Beamformers", (IEEE), (https://ieeexplore.ieee.org/document/4217011), (2 pages).

Wikipedia, "Audio Feedback", (https://en.wikipedia.org/wiki/Audio_feedback),(3 pages).

Wikipedia, "Signal separation" (https://en.m.wikipedia.org/wiki/Signal_separation), (3 pages).

Zoom, "Zoom Rooms", (https://www.zoom.com/en/products/meeting-rooms/), (4 pages).

* cited by examiner

SYSTEMS AND METHODS FOR MANAGING AUDIO INPUT DATA AND AUDIO OUTPUT DATA OF VIRTUAL MEETINGS

BACKGROUND

This disclosure is directed to systems and methods for managing audio input and output data received from users during a virtual meeting. In particular, first and second users co-located at a particular location during the virtual meeting may be provided with first and second audio output streams, respectively, generated based on first and second intermediate audio streams corresponding to voices of third and fourth users, respectively, located remotely from the particular location. In some embodiments, the third and fourth users may be provided with third and fourth audio output streams, respectively, generated based on the third and fourth intermediate audio streams corresponding to voices of the first and second users, respectively.

SUMMARY

Advancements in communication technology have allowed users to attend virtual meetings with colleagues, family, and friends located in different physical locations than the users, as well as virtually meet new friends, colleagues, classmates, and others with whom they might not be familiar. For example, conferencing systems (e.g., Microsoft® Teams, Skype®, Zoom™, etc.) may be used to host online video meetings, with parties joining virtually from around the world for work, school, and/or recreation. Such video meetings enable users in separate, geographically distributed physical locations to have a collaborative face-to-face conversation via a video conference, even if one or more of such users are on the go (e.g., utilizing a smartphone or a tablet).

However, if multiple devices joined to a virtual conference are proximate to each other in the same physical location, acoustic phenomena such as audio distortion issues e.g., feedback and echo, may occur. For example, in a virtual meeting with six participants, three of the participants may be working remotely at their respective home offices, while the three other participants might be physically present in a conference room at the same office building. In such conference room, microphones of multiple devices may be receiving the same audio and/or output speakers of such devices may be playing the same audio, and individuals in the conference room hear the ambient sound in the conference room, as well as via the devices' (e.g., laptops') output speakers, and each microphone of the laptops captures the ambient audio from both attendees (not only from its respective user but also from the other attendees) and laptop output speakers. In such a scenario, feedback generally occurs when sound from the output speakers is immediately picked up by the microphone (such as when the microphone and output speakers are too close together), creating a continuous loop, and the loop amplifies the sound each time it goes around, potentially resulting in loud, high-pitched squeals that is quite irritating and distracting to users participating in a conference. Feedback has been described as a signal feeding back into itself. Further, echo generally occurs when the sound that is output from the output speakers is captured by the microphone, sent back through the system, and then output again through the output speakers, which can create a repeated sound or "echo" effect that is heard a noticeable amount of time after the original sound.

In one approach, in an effort to avoid these audio distortion issues, participants may manually manage their audio settings. For example, the three participants sharing the conference room in the office building might designate one device to play the audio while "passing the baton" between participants, e.g., if a first participant wants to speak, he or she orally (or with a hand motion or other gesture) requests the other participants to mute their device's microphones. The first participant then unmutes his or her device's microphone and speaks, and when finished speaking, the first participant again mutes his or her mic and gives the floor to the next participant. However, this manual process is inefficient, tedious and can become unmanageable, such as when multiple participants want to speak at the same time, or if users speak out of turn or are not paying attention to the first participant's request to mute their devices.

In another approach, in an effort to avoid the aforementioned audio distortion issues, each of the three participants sharing the conference room in the office building may wear headphones connected to their devices, so that such headphones individually output audio of the video conference to each user, rather than multiple output speakers outputting the audio in the environment. However, while this approach may address certain audio quality issues, this approach detracts from the social and collaborative benefits that might typically be gained via in-person interactions, since it effectively isolates each user from the other users in the conference room. For example, the headphones may prevent or hinder users in the same conference room from hearing each other, and thus they may hear only the audio feed of the video conference. Moreover, it be may uncomfortable, undesirable and/or inconvenient for each user to wear headphones.

In another approach, a single device may be provided in the conference room to act as a shared microphone and shared output speaker for each video conference participant that is present in the same physical conference room. However, this may lead to poor audio quality for other participants in the video conference. For example, if Alice, Bob, and Charles are present in the conference room and decide to use Alice's laptop microphone (or a dedicated conferencing device) as the audio input for their group, the audio quality might vary depending on who is speaking, e.g., Bob and Charles may sound distant when talking, and may be difficult to understand for the participant's at locations other than the conference room. Further, in such an approach, it may be unclear (to video conference participants not present in the conference room) which user in the conference room is speaking (e.g., Alice, Bob or Charles) because their devices indicate that any audio from the conference room is coming from Alice, since only the microphone of Alice's laptop (or the dedicated conferencing device) is being used. In addition, in this scenario where multiple users are sharing a single device, such as the dedicated conferencing device or a user's personal device, to participate in a conference, there is a lack of per-participant control. For example, if there is a problematic participant at a shared device, a host has to mute or unmute the entire group of users participating via such device, even if only one of those participants is causing the issue, and problematic participant cannot be removed from the conference without removing all participants that are joined to the conference via the shared device.

To help overcome these problems, systems, methods, and apparatuses are described herein for determining that a first user and a second user, co-located at a particular location, are participating in a virtual meeting via a first computing device and a second computing device, respectively, wherein the first computing device is associated with a first microphone and a first output speaker, the second computing device is associated with a second microphone and a second output speaker, and each of the first and second computing devices is connected via a network to a virtual meeting server providing the virtual meeting. The systems, methods, and apparatuses may determine that a third user and fourth user, each located remotely from the particular location, are participating in the virtual meeting via one or more computing devices, wherein the one or more computing devices are associated with at least one third microphone and at least one third output speaker. The systems, methods, and apparatuses may receive, at the virtual meeting server, at least one audio input stream comprising voices of the third user and the fourth user, wherein the at least one audio input stream is detected during the virtual meeting using the at least one third microphone, and generate, at the virtual meeting server and based on the at least one audio input stream, a first intermediate audio stream corresponding to the detected voice of the third user and a second intermediate audio stream corresponding to the detected voice of the fourth user, wherein the first intermediate audio stream does not include the voice of the fourth user, and the second intermediate audio stream does not include the voice of the third user. The systems, methods, and apparatuses may generate, based on the first intermediate audio stream and the second intermediate audio stream, a first audio output stream and a second audio output stream, and during the virtual meeting, synchronously cause the first audio output stream to be output by the first output speaker of the first computing device and cause the second audio output stream to be output by the second output speaker of the second computing device.

Such aspects disclosed herein provides a dynamic and adaptive approach to managing audio in co-located settings, by generating audio streams on a per-participant basis, and by treating co-located devices as a unified system, to provide consistent audio quality without audio feedback and echo, without the need for manual adjustments (e.g., "passing the baton"); without the drawbacks of requiring co-located users to wear headphones; and without the drawbacks of relying on a single device for audio input and output, thereby preserving the natural dynamics of in-person interactions, resulting in a more fluid, natural, and high-quality audio experience for all virtual meeting participants. In some embodiments, such aspects disclosed herein may enable audio output from the output speakers to be carefully processed and synchronized, to ensure that an individual hears voices from external attendees as a singular, unduplicated sound stream. In some embodiments, such aspects disclosed herein may enable the microphones to capture clear audio from multiple users speaking at the same location, while simultaneously filtering out any sound input originating from the laptop output speakers, to ensure a seamless and coherent communication experience for both participants in the room and external virtual meeting participants.

For example, as between the per-participant intermediate audio streams generated for co-located users at a particular location, the systems, methods, and apparatuses described herein can manage each audio output stream. In some embodiments, as between the per-participant audio streams generated for co-located users at a particular location, the systems, methods, and apparatuses described herein can filter out audio determined to have been output by an output speaker of one of such devices, and/or can filter out audio that is redundant as between the audio streams, and can output the filtered streams as audio output streams at different devices at the particular location. Moreover, as between the audio input (and/or intermediate audio) streams originating from devices at the same location, the systems, methods, and apparatuses described herein can filter out audio determined to have been output by an output speaker of one of such devices, and/or can filter out audio that is redundant as between the audio streams. In some embodiments, one or more microphones of co-located user devices may be selectively muted (e.g., when one or more users of devices including such one or more microphones are determined not to be speaking, or are determined to be associated with lower-quality audio than another of the co-located microphones), to help minimize feedback and/or echo. As another example, a host of a virtual meeting may want to allow one user to talk but not another, and the aspects described herein allow for muting or blocking (and/or otherwise declining to output) a single participant's audio output stream, even if such single participant is co-located with other participants and is providing input to a single common microphone or microphone array.

In some embodiments, the systems, methods, and apparatuses described herein may be further configured to first identify all the possible groups of co-located output speakers and microphones, analyze their relative locations, and treat each group of co-located output speakers and microphones as a single system with multiple output speakers and multiple microphones. Further, the audio input streams from a particular group can be collectively processed to generate one or more audio output streams to be delivered to other participants, and at the same time, audio signals from other participants at other locations can be delivered using the respective co-located multi-output speakers in such particular group, to provide optimized audio to the participants in such particular group. In some embodiments, a virtual meeting server may generate an audio (input and output) stream for each attendee in a particular co-located group, and the co-located output speakers can render different audio output for different remote attendees.

In some embodiments, generating the first audio output stream and the second audio output stream further comprises combining the first and second intermediate audio streams to generate the first audio output stream, and combining the first and second intermediate audio streams to generate the second audio output stream, wherein the combination of the first and second intermediate audio streams used to generate the first audio output stream is different from the combination of the first and second intermediate audio streams used to generate the second audio output stream.

In some embodiments, generating the first audio output stream and the second audio output stream further comprises preventing inclusion of the voice of the fourth user, corresponding to the second intermediate audio stream, in the first audio output stream, and preventing inclusion of the voice of the third user, corresponding to the first intermediate audio stream, in the second audio output stream In some embodiments, the particular location is a first location; the third user and the fourth user are co-located at a second location; and generating the first intermediate audio stream corresponding to the detected voice of the third user and the second intermediate audio stream corresponding to the detected voice of the fourth user further comprises identifying one or more audio portions in the at least one audio input stream corresponding to a voice of the third user and identifying at least one audio portion in the at least one audio input stream corresponding to a voice of the fourth user. In some embodiments, generating the first audio output stream corresponding to the detected voice of the third user and the second audio output stream corresponding to the detected voice of the fourth user further comprises extracting the one or more audio portions from the at least one audio input stream to generate the first intermediate audio stream, and extracting the at least one audio portion from the at least one audio input stream to generate the second intermediate audio stream.

In some embodiments, generating the first intermediate audio stream and the second intermediate audio stream further comprises processing the at least one audio input stream to determine whether the at least one audio input stream comprises one or more attributes associated with audio feedback or audio echo. In some embodiments, generating the first audio output stream and the second audio output stream further comprises, in response to determining that the at least one audio input stream comprises one or more attributes associated with audio feedback or audio echo, processing the at least one audio input stream to perform at least one of filtering out audio determined to have been output by the at least one third output speaker or filtering out audio that is redundant as between first and second audio input streams of the at least one audio input stream.

In some embodiments, the one or more computing devices at the second location comprise a third computing device associated with the third user and a fourth computing device associated with the fourth user, the third computing device comprising the third microphone and the fourth computing device comprising a fourth microphone. In some embodiments, the systems, methods, and apparatuses described herein may be further configured to determine audio characteristics associated with the at least one audio input stream comprising the voices of the third user and the fourth user; determine, based on the audio characteristics, that audio signals being captured by the third microphone are of a higher quality than audio signals being captured by the fourth microphone; and cause the fourth microphone to be muted. For example, one of the participant's devices may be soft-muted (e.g., muted at the software layer of a virtual meeting application facilitating the virtual meeting, rather than at a system layer of the virtual meeting application, to enable detected signals at the soft-muted output speaker and/or microphone to still be analyzed by the system) when multiple people in a remote conference room are logged into (or otherwise participating in) the conference, thereby preventing audio distortion issues.

In some embodiments, the one or more computing devices at the second location comprise a third computing device associated with the third user and a fourth computing device associated with the fourth user, the third computing device comprising the third microphone and the fourth computing device comprising a fourth microphone. In some embodiments, the systems, methods, and apparatuses described herein may be further configured to determine whether a voice that is currently being detected at the third microphone and the fourth microphone belongs to the third user or the fourth user, and, in response to determining that the voice that is currently being detected at the third microphone and the fourth microphone belongs to the third user, causing the fourth microphone to be muted. For example, a microphone of a non-talking virtual participant may be muted, and this may occur continuously and dynamically, to modify which microphones are muted and which are active based on who is talking during the virtual meeting.

In some embodiments, the at least one third microphone is included in a particular computing device, located at the second location, to detect the voices of the third and fourth users at the second location. In some embodiments, the systems, methods, and apparatuses described herein may be further configured to modify the output of at least one of the first audio output stream or the second audio output stream by ceasing use of the first intermediate audio stream, corresponding to the third user, in generating the first audio output stream or by ceasing use of the second intermediate audio stream, corresponding to the fourth user, in generating the second audio output stream.

In some embodiments, generating the first audio output stream and the second audio output stream further comprises preventing inclusion of the voice of the fourth user, corresponding to the second intermediate audio stream, in the first audio output stream; and preventing inclusion of the voice of the third user, corresponding to the first intermediate audio stream, in the second audio output stream; and modifying the output of at least one of the first audio output stream or the second audio output stream by blocking output of at least one of the first audio output stream at the first computing device or the second audio output stream at the first computing device.

In some embodiments, the systems, methods, and apparatuses described herein may be further configured to, based on an identity of the third user, apply a first weighting function to the first audio output stream, and based on an identity of the fourth user, apply a second weighting function to the second audio output stream associated with the fourth user. In some embodiments, synchronously causing the first audio output stream to be output by the first output speaker of the first computing device and causing the second audio output stream to be output by the second output speaker of the second computing device further comprises modifying, based on the first weighting function applied to the first audio output stream and the second weighting function applied to the second audio output stream, one or more parameters of the first audio output stream to emphasize the output of the first audio stream in relation to the output of the second audio output stream.

In some embodiments, generating the first audio output stream and the second audio output stream further comprises combining the first and second intermediate audio streams to generate the first audio output stream based on applying a first weighting function to the first intermediate audio stream and applying a second weighting function to the second intermediate audio stream; and combining the first and second intermediate audio streams to generate the second audio output stream based on applying a third weighting function to the first intermediate audio stream and applying a fourth weighting function to the second intermediate audio stream.

In some embodiments, the systems, methods, and apparatuses described herein may be further configured to determine, at the particular location, a location of the first output speaker and a location of the second output speaker. In some embodiments, synchronously causing the first audio output stream to be output by the first output speaker of the first computing device and causing the second audio output stream to be output by the second output speaker of the second computing device further comprises rendering spatial audio based at least in part on the determined location of the first output speaker and the determined location of the second output speaker. For example, a virtual meeting participant Alice may be located in a first location (e.g., in a first conference room in New York), and virtual meeting participants Bob and Charles may be co-located in a second location (e.g., a second conference room in California). Each of Bob and Charles may be assigned a virtual position within the first conference room such that their voices sound as if they are speaking from different locations, e.g., when Bob is talking, his or her voice sounds (from Alice's perspective) as if Bob is speaking from a distinct location as compared to when Charles is speaking. For example, the system may determine that at a large display at the front of the second conference room, Charles appears to the right of Bob, and thus the system may provide respective audio streams of Charles and Bob such that participants in the first conference room (e.g., Alice) perceive Charles's stream to be originating more from the right side of the display and/or first conference room, and Bob's stream to be originating more from the left side of the display and/or first conference room. Such aspects enable an improved user experience for those in the first conference room (e.g., Alice), by making it easier to detect who is talking, even if Bob and Charles sound similar and a user is not looking at the screen (e.g., if Alice's head is down taking notes or she is otherwise not focused on the display at the front of the room). On the other hand, in the aforementioned prior approaches, if Charles and Bob are co-located and speaking into a single common mic, separate per-participant streams for each are not generated, which does not facilitate the assigning of virtual positions and does not facilitate the output of spatial audio output.

In some embodiments, the systems, methods, and apparatuses described herein may be further configured to, while causing the first audio output stream to be output by the first output speaker of the first computing device, providing an indication, at each of the first computing device and the second computing device, that the voice of the third user is being output, and, while causing the second audio output stream to be output by the second output speaker of the second computing device, providing an indication, at each of the first computing device and the second computing device, that the voice of the fourth user is being output.

In some embodiments, the at least one audio input stream is a single audio input stream comprising the voices of the third user and the fourth user detected at the third microphone and a fourth microphone. The systems, methods, and apparatuses described herein may be further configured to detect the single audio input stream based on treating the third microphone and the fourth microphone, co-located at the second location, as a microphone array, and generate the first audio output stream and the second audio output stream based on the single audio input stream.

In some embodiments, the first computing device comprises the first microphone and the first output speaker, and the second computing device comprises the second microphone and the second output speaker. In some embodiments, the first output speaker is external to the first computing device and is coupled to the first computing device, and/or the second output speaker is external to the second computing device and is coupled to the second computing device.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
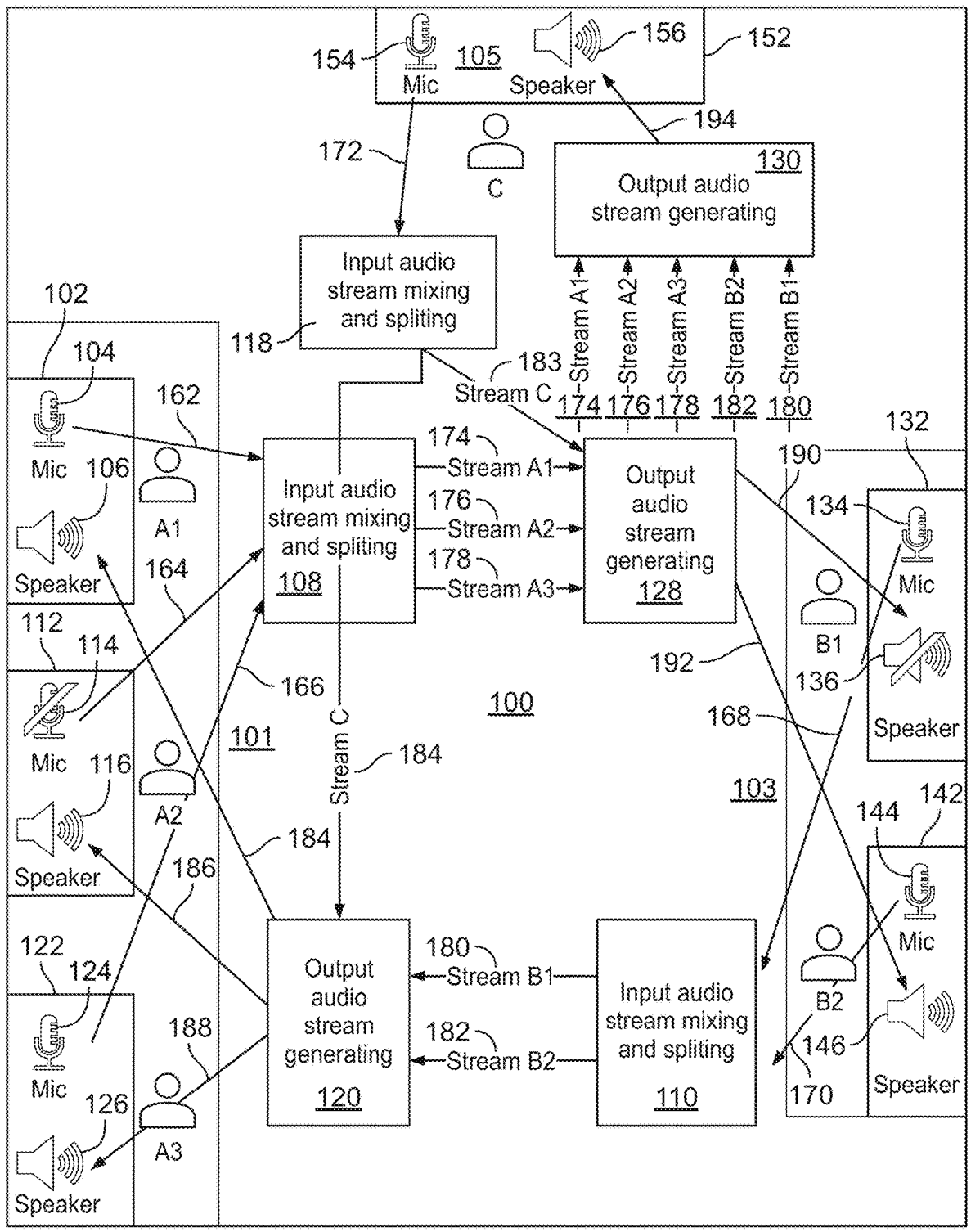
FIG. 1 shows an illustrative block diagram for managing audio input data and audio output data of virtual meetings, in accordance with some embodiments of this disclosure.

FIG. 1 shows an illustrative block diagram 100 for managing audio input data and audio output data of virtual meetings, in accordance with some embodiments of this disclosure. As shown in FIG. 1, users A1, A2, A3, B1, B2, and C may be participating in a virtual meeting. In some embodiments, users A1, A2, and A3 maybe co-located at a first location 101 (e.g., a conference room in an office building in New York City) that is remote from second and third locations 103 and 105 (e.g., a conference room in a building in California, and a residence in New Jersey, respectively) that are remote from the first location, where users B1 and B2 may be located at the second location, and user C may be located at the third location.

Figure 2:
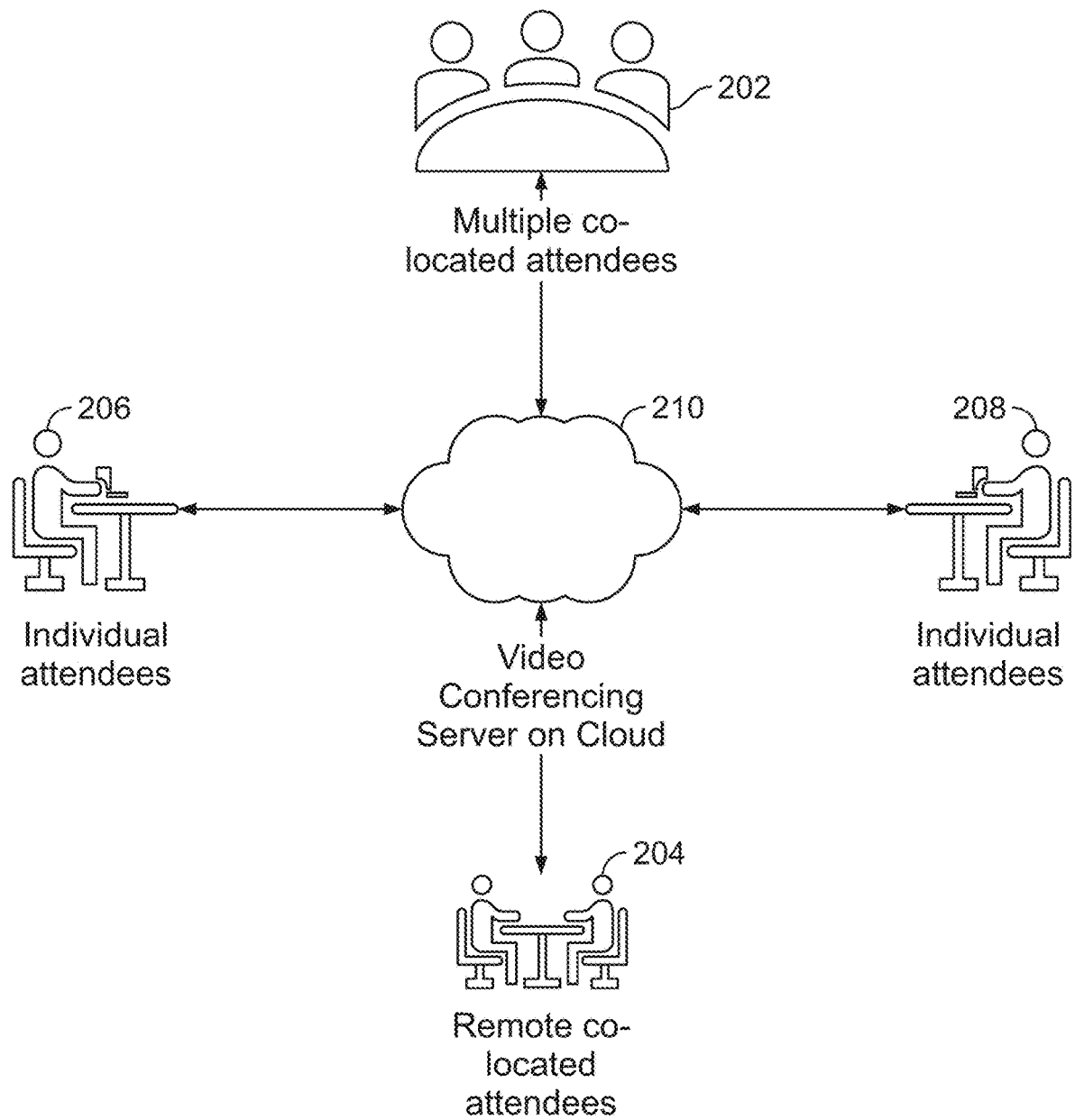
FIG. 2 shows an illustrative block diagram 200 for providing virtual meetings, in accordance with some embodiments of this disclosure.

FIG. 2 shows an illustrative block diagram 200 for providing virtual meetings, in accordance with some embodiments of this disclosure. In some embodiments, the virtual meeting may be provided by way of a virtual meeting application, executing at, for example, one or more remote cloud servers 210 of FIG. 2; one or more computing devices of co-located attendees 202 of FIG. 2 (e.g., users A1, A2, and A3 of FIG. 1); one or more computing devices of remote co-located attendees 204 of FIG. 2 (e.g., user B1 and B2 of FIG. 1); one or more computing devices of individual attendee 206 or individual attendee 208 of FIG. 2 (e.g., user C of FIG. 1); and/or at any other suitable computing devices; or any combination thereof. Server(s) 210 may facilitate the virtual meeting by way of a connection over one or more networks (e.g., the Internet) to such computing devices of co-located attendees 202, remote co-located attendees 204, individual attendee 206, and/or individual attendee 208.

The virtual meeting application may be configured to perform the functionalities described herein. In some embodiments, the virtual meeting application may comprise, correspond to, or be included in a system that further comprises, one or more extended reality (XR) applications, one or more video communication applications and/or audio communication applications and/or other communication applications, one or more streaming media applications, one or more social networking applications, one or more image or video capturing and/or editing applications, one or more image analysis applications, any suitable number of networks, any suitable number of displays, sensors or devices, or any other suitable software and/or hardware components, or any combination thereof.

In some embodiments, the virtual meeting application may be installed at or otherwise provided (e.g., by server 210 of FIG. 2 over a network) to a particular computing device, may be provided via an application programming interface (API), and/or may be provided as an add-on application to another platform or application. In some embodiments, software tools (e.g., one or more software development kits, or SDKs) may be provided to any suitable party, to enable the party to implement the functionalities described herein. In some embodiments, the virtual meeting application may be understood as middleware or application software or any combination thereof. In some embodiments, the virtual meeting application may be considered as part of an operating system (OS) of a virtual meeting participant's computing device or separate from the OS of the virtual meeting participant's computing device. The OS may be operable to initialize and control various software and/or hardware components of the computing device.

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such an environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

In some embodiments, the virtual meeting may be a computer-generated session, such as, for example, a video communication session, a video call or video conference, an audio call, an audio communication session, a chat communication session, an XR session, an XR meeting, an XR game, a multi-player video game, a watch party of a media asset, or any other suitable communication session, or any combination thereof, as between any suitable number of users, for any suitable purpose (e.g., business, medical, entertainment, social, communicative, trials/court proceedings, political, governmental or civic events, or any other suitable purpose, or any combination thereof). The virtual meeting may correspond to a two-dimensional (2D) or three-dimensional (3D) environment, or any other suitable environment. As referred to herein, the term "media asset" may be understood to refer to an electronically consumable user asset, e.g., television programming, as well as pay-per-view programs, on-demand programs (as in video-on-demand (VOD) systems), internet content (e.g., streaming content, downloadable content, webcasts, etc.), XR content, video clips, audio, playlists, websites, articles, electronic books, blogs, social media, applications, games, and/or any other media or multimedia, and/or combination of the above.

In some embodiments, each of co-located users A1, A2, and A3 at location 101; co-located users B1 and B2 at location 103; and user C at location 105 may be participating in the virtual meeting via one or more computing devices. Each computing device may comprise a microphone configured to detect audio input of users, a camera configured to capture images and/or video of users, an output speaker configured to generate audio output, and/or a display configured to generate visual output of users or other virtual meeting data, and/or any other suitable components.

In some embodiments, each user may be participating in the virtual meeting by way of a respective computing device. For example, as shown in FIG. 1, with respect to co-located users A1, A2, and A3, user A1 may be participating in the virtual meeting via computing device 102 which comprises (or is otherwise associated with) microphone 104 and output speaker 106, user A2 may be participating in the virtual meeting via computing device 112 which comprises (or is otherwise associated with) microphone 114 and output speaker 116, and user A3 may be participating in the virtual meeting via computing device 122 which comprises (or is otherwise associated with) microphone 124 and output speaker 126. As another example, with respect to co-located users B1 and B2, user B1 may be participating in the virtual meeting via computing device 132 which comprises (or is otherwise associated with) microphone 134 and output speaker 136, and user B2 may be participating in the virtual meeting via computing device 142 comprising microphone 144 and output speaker 146. As another example, user C may be participating in the virtual meeting via computing device 152 which comprises (or is otherwise associated with) microphone 154 and output speaker 156. In other words, there may be a 1:1 ratio between computing devices and users in the virtual meeting.

In some embodiments, for one or more of the computing devices participating in the virtual meeting, a least one input or output component may be external to the computing device. For example, for each of the computing devices (or a subset thereof), its microphone, output speaker, and/or display may be external to the computing device, e.g., via a wired connection or via a wireless connection, such as, for example, short-range communication (e.g., Bluetooth), wireless Internet, or any other suitable wireless connection, or any combination thereof. For example, microphone 104 and/or output speaker 106 may be coupled (via the wired or wireless connection) to computing device 102; microphone 114 and/or output speaker 116 may be coupled (via the wired or wireless connection) to computing device 112; microphone 124 and/or output speaker 126 may be coupled (via the wired or wireless connection) to computing device 122; microphone 134 and/or output speaker 136 may be coupled (via the wired or wireless connection) to computing device 132; microphone 134 and/or output speaker 136 may be coupled (via the wired or wireless connection) to computing device 132; microphone 144 and/or output speaker 146 may be coupled (via the wired or wireless connection) to computing device 142; and/or microphone 144 and/or output speaker 146 may be coupled (via the wired or wireless connection) to computing device 142.

In some embodiments, the virtual meeting application may receive audio input streams 162, 164, and 166 detected by microphones 104, 114, and 124 of computing devices 102, 112, and 122, respectively. For example, each of audio input streams 162, 164, and 166 may include voices of one or more of users A1, A2, and A3, as such users may be co-located at location 101. In some embodiments, at least one of the co-located microphones (e.g., microphone 114 of computing device 112 of user A2) may be muted, and thus audio input stream 164 may not be sent (or such microphone may be muted at the software level but not the system level, to allow such audio signals to be processed but not output to other remotely located users participating in the virtual meeting). In some embodiments, the virtual meeting application may receive audio input streams 168 and 170 detected by microphones 134 and 144 of computing devices 132 and 142, respectively. For example, each of audio input streams 168 and 170 may include voices of one or more of users B1 and B2, as such users may be co-located at location 103. In some embodiments, the virtual meeting application may receive audio input stream 172 detected by microphone 154 of computing device 152. For example, audio input stream 172 may include only the voice of user C, as user C may not be co-located with other virtual meeting participants.

In some embodiments, at least one of the computing devices participating in the virtual meeting may be shared by at least two users, e.g., users B1 and B2 might share the audio and/or video resources of computing device 132 to participate in the virtual meeting, and computing device 142 of user B2 may not be connected to server 210 of FIG. 2 and thus may not be participating in the virtual meeting. In other words, the number of users participating in the virtual meeting may exceed the number of client computing devices providing the virtual meeting to the users, and the number of co-located users in a particular location may exceed the number of computing devices participating in the virtual meeting from such particular location. For example, at least one group of co-located users may be participating in the virtual meeting via a same, shared computing device (e.g., in a conference room of an office, capable of capturing video of users in the conference room, receiving audio of users in the conference room, displaying (e.g., via a projector or otherwise) a video feed of users participating in the virtual meeting, and/or outputting an audio feed of users participating in the virtual meeting). As another example, users A1 and A2 may be sharing a microphone and/or output speaker of a particular computing device (e.g., a laptop, or a specialized audio-video device in a conference room, where such device is tailored for video conferencing) when participating in the virtual meeting, and the virtual meeting may be configured to generate a per-participant audio (audio input, intermediate audio stream and/or audio output) stream for users A1 and A2, respectively, using the techniques described herein. The virtual meeting application may determine that at least two users are sharing a computing device using any suitable technique, e.g., based on determining that, in a particular location, more distinct voices are being detected than the number of participating computing devices; based on user input indicating that multiple users are sharing a computing device; based on metadata associated with the location and/or computing device (e.g., a conference room or specialized conference room equipment) that is unlikely to be used by a single user; or based on any other suitable technique; or any combination thereof.

Computing devices 102, 112, 122, 132, 142, and 152 may comprise or correspond to a head-mounted computing device; a mobile device such as, for example, a smartphone or a tablet; a desktop computer; a laptop computer; a tablet; a smart watch or wearable device; smart glasses; a smart television; a display device; a projector; a stereoscopic display; a wearable camera; XR glasses; XR goggles; an XR head-mounted display (HMD); a near-eye display device; any other suitable computing device; or any combination thereof.

The virtual meeting application may enable computing devices 102, 112, 122, 132, 142, and/or 152 to receive and transmit over a network (e.g., communication network 609 of FIG. 6) audio signals, video signals, images, textual data, emojis, and/or any other suitable data, in connection with the virtual meeting. For example, such audio signals may be spoken by a particular user and/or may be other audio present in the environment surrounding the particular user and may be detected by a microphone of a computing device participating in the virtual meeting. The images may be still images and/or video, captured by a camera of a computing device of a particular user (or other camera external to the computing device) to depict a digital representation of a particular user and/or the environment surrounding such user. In some embodiments, the virtual meeting application may provide messaging and chat functions to allow users to interact with each other.

Figure 6:
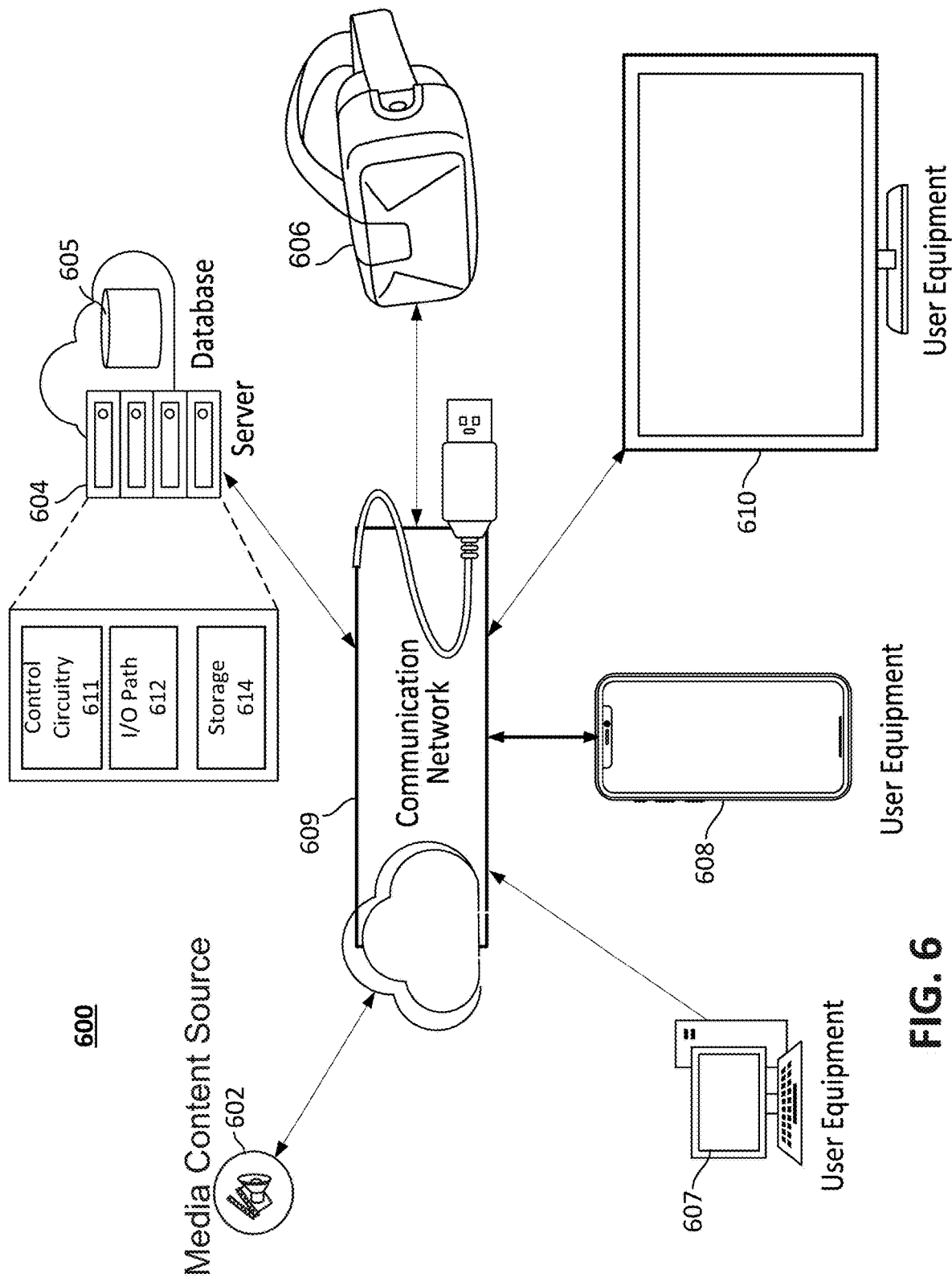

In some embodiments, the virtual meeting may be hosted by one or more remote servers (e.g., via communication network 609 of FIG. 6). In some embodiments, the virtual meeting may be scheduled for a particular time (e.g., via email invites or any other suitable electronic message invite), automatically or based on input from a user, or may be spontaneously created at the request of a user, with any suitable number of participants. In some embodiments, each user may access the virtual meeting via a connected computing device (which may be equipped with or otherwise proximate to a camera and a microphone) accessing one or more of a web address or virtual room number, e.g., by entering his or her username and password. In some embodiments, one or more users may be a moderator or host, where a designated moderator may have the task of organizing the meeting and/or selecting the next participant member to speak or present. In some embodiments, the virtual meeting may be utilized to record content, which may be transmitted in real time (e.g., live-streamed) to other users. In some embodiments, the virtual meeting may be recorded, stored and transmitted at a later time to other users and/or posted to any suitable website or application (e.g., a social network, video sharing website application) for consumption by other users.

In some embodiments, when the virtual meeting begins, each client device may connect to one or more central virtual meeting servers (and/or one or more virtual edge servers) hosted on the cloud, e.g., server 210 of FIG. 2. In some embodiments, the virtual meeting application may identify co-located devices participating in the virtual meeting, e.g., the virtual meeting application may determine that computing devices 102, 112, and 122 (associated with users A1, A2, and A3, respectively) are co-located, e.g., in a conference room in an office building in New York at location 101, and that computing devices 132 and 142 (associated with users B1 and B2, respectively) are co-located at location 103, e.g., in a conference room in an office building in California. The co-located participants or attendees may be indicated as such via the virtual meeting application. For example, the virtual meeting application may provide indications, at or near depictions of users A1, A2, and A3 on a user interface, of attendee 1-group (or location) 1, attendee 2-group (or location) 1, attendee 2-group (or location) 1, respectively, and may provide indications, at or near a depictions of users B1 and B2 on a user interface, of attendee 1-group (or location) 2, attendee 2-group (or location) 2.

Figure 3A:
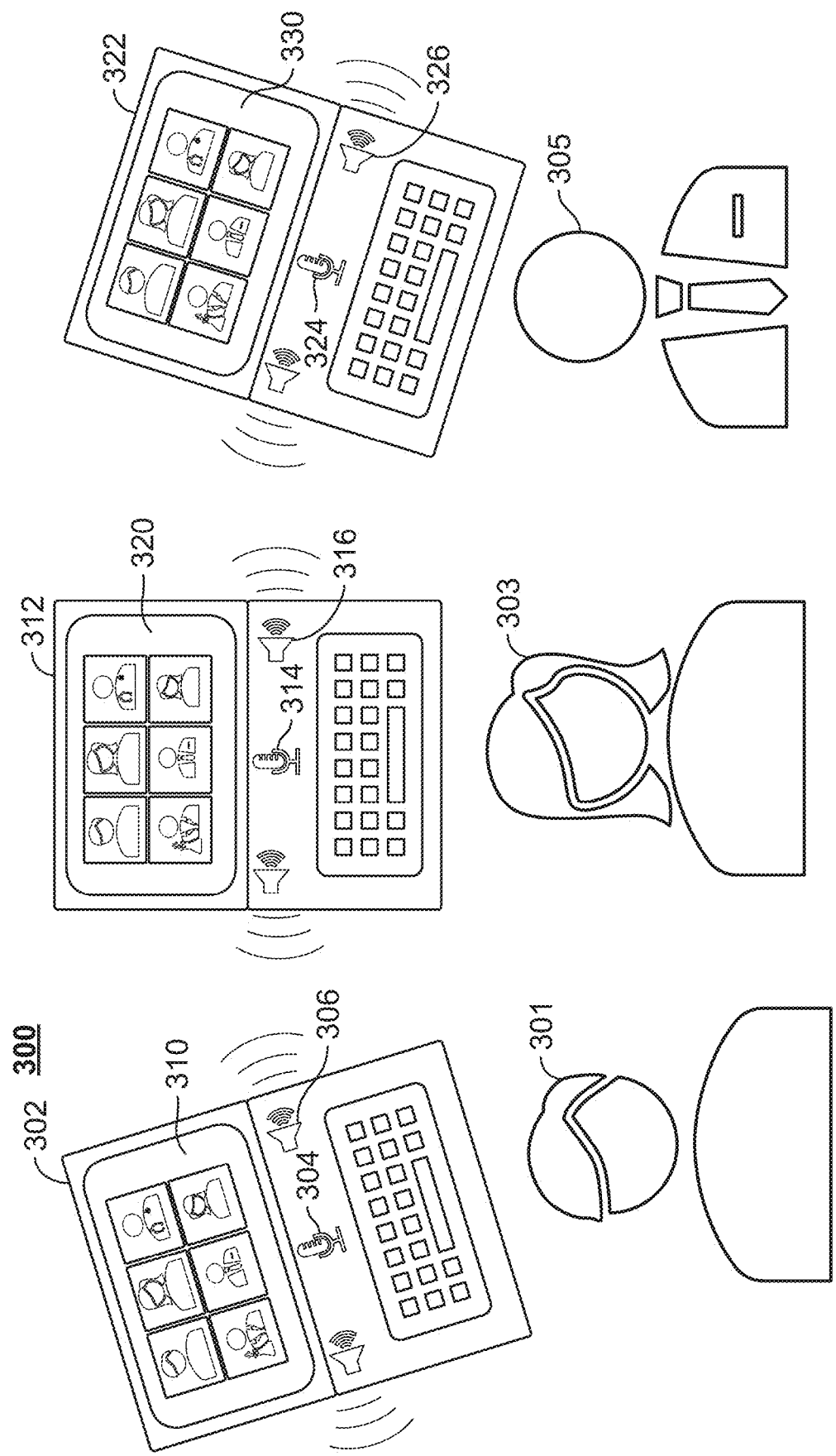
FIG. 3A shows co-located users participating in a virtual meeting, in accordance with some embodiments of this disclosure.

FIG. 3A shows co-located users participating in a virtual meeting, in accordance with some embodiments of this disclosure. Users 301, 303, and 305 (which may correspond to users A1, A2, and A3 of FIG. 1) may be participating in a virtual meeting via computing devices 302, 312, and 322 and may be co-located at, e.g., location 300 (which may correspond to location 101 of FIG. 1). Computing device 302 comprises microphone 304 and output speaker 306, computing device 312 comprises microphone 314 and output speaker 316, and computing device 322 comprises microphone 324 and output speaker 326.

Displays 310, 320, and 330 of computing devices 302, 312, and 324 may depict digital representations of the participants in the virtual meeting. Such digital representation may correspond to a digital replica of facial and/or other bodily features or other elements of the appearance of the user, optionally modified by, e.g., XR portions or modified or altered with other suitable content or effects. In some embodiments, a digital representation may correspond to an avatar. The avatar may correspond to any suitable digital representation of a user, e.g., a replica of the user, an XR avatar, an animated or "cartoon" representation of a user, a memoji or emoji, or any other suitable digital representation, or any combination thereof. In some embodiments, the avatar for a particular user may resemble the user (e.g., facial and/or bodily features, clothing, etc.) or may not resemble the user (e.g., the user may like dogs and choose a digital representation of a dog as his or her avatar). In some embodiments, the virtual meeting application may detect the real-world movements and actions of a user and cause the avatar to mimic such real-world movements and actions, e.g., to interact with objects or other avatars in an XR environment.

In some embodiments, one or more options may be provided, e.g., via displays 310, 320, and 330 of computing devices 302, 312, and 324, respectively, to show only the digital representations of users that are not co-located with the user, or to show only the digital representations of users that are co-located with the user, or to show only the digital representations of users that are co-located at another location than the user. In some embodiments, one or more options may be provided, e.g., via displays 310, 320, and 330 of computing devices 302, 312, and 324, to enable users to specify which audio output stream should be provided at which co-located computing device. For example, first user 302 (e.g., corresponding to user A1 of FIG. 1) may request to be provided with an audio output stream (e.g., audio output stream 184 of FIG. 1) of a voice of a third user (e.g., user B1 of FIG. 1, without including a voice of user B2 co-located with user B1), and second user 304 (e.g., corresponding to user A2 of FIG. 1) may request to be provided with an audio output stream (e.g., audio output stream 186 of FIG. 1) of a fourth user (e.g., user B2 of FIG. 1 or user C of FIG. 1, and in the case of the audio output stream corresponding to user B2, without including a voice of user B1 co-located with user B2). In some embodiments, co-located users may be prevented from selecting (e.g., based on the virtual meeting application graying out the associated option), or may not be provided with the option to select, an audio output stream of the same remote user. As another example, first user 302 may request to be provided with an audio output stream comprising a combination of voices of the third and fourth user, with a prioritization for the third user, e.g., to increase a volume or gain of the output when a voice of the third user is being output to the first user, but to decrease a volume of gain of the output when a voice of the fourth user is to be output to the first user, and/or to selectively mute a voice of the fourth user in the audio output stream provided to the first user.

In some embodiments, the virtual meeting application may identify co-located devices based on determining a common audio signature as between a group of devices. For example, the virtual meeting application may generate an audio signature based on detected voices and/or other sound (e.g., provided to the virtual meeting server via audio input streams 162, 164, and/or 166) detected at the location of users A1, A2, and A3 of FIG. 1. As referred to herein, the term "audio signature" or "audio fingerprint" may refer to any kind of a digital or analog representation of a sound. The audio signature may be a digital measure of certain acoustic properties that is deterministically generated from an audio signal and may be used to identify an audio sample and/or quickly locate similar items in an audio database. For example, an audio signature may be a file, data, or data structure that stores time-domain sampling of an audio input. In another example, an audio signature may be a file, data, or data structure that stores a frequency-domain representation (e.g., a spectrogram) of an audio input. In some embodiments, the virtual meeting application may perform a fast Fourier transform (FFT) operation on time-domain samples of the audio to produce a frequency-domain representation of the audio. In some embodiments, the virtual meeting application may employ audio compression techniques, to reduce network resources and/or computing power used to process the signal. In some embodiments, noise-reduction techniques may be employed (e.g., in a pre-processing stage) to filter out unwanted signals.

In some embodiments, the generated audio signature may comprise a time-domain and/or frequency-domain representation (e.g., a spectrogram) of the signal. The virtual meeting application may perform encoding and/or decoding of the generated audio signature, and/or may perform digital signal processing on the generated audio signature, e.g., frequency analysis, peak volume detecting, audio hashing, waveform matching, and/or any other suitable digital signal technique may be used to generate an audio signature. As another example, the audio signature may comprise an audio signature or hash calculation deterministically generated from a predefined portion of the detected audio signal, e.g., at the location of users A1, A2, and A3. In some embodiments, the virtual meeting application may generate a features vector, representative of the audio signature, which may comprise a sequence of values representing suitable audio or acoustic features or characteristics (e.g., amplitude, modulation, tone, frequency, volume, speed) of the audio signal.

In some embodiments, the virtual meeting application may analyze audio characteristics of the signal to identify audio signatures using any suitable audio analysis technique (e.g., frequency analysis to determine a base frequency and unique harmonic pattern of a particular voice, phoneme analysis to determine an accent of a particular voice). For example, the wave amplitude of the audio signal may be used to determine the volume of the voice of user A1 and/or analyze frequency data to determine the pitch and tone of the voice search query. The virtual meeting application may identify non-vocal audio such as music, sound effects, and the like using similar frequency analysis techniques or any other suitable method of audio analysis. The identified audio characteristics may be stored in association with a timestamp of when the audio signal was received. In some embodiments, the audio signal may be converted to transcribed text, and such text may be used to generate the audio signature. For example, the virtual meeting application may transcribe the audio response into a string of text using any suitable automatic speech recognition technique and/or any suitable natural language understanding technique.

Additionally or alternatively to receiving audio detected by, for example, microphones 104, 114, and 124 of computing devices 102, 112, and 122, respectively, of FIG. 1, and included in one or more of audio input streams 162, 164, and 166, to identify a common audio signature to determine that users A1, A2, and A3 (and their respective computing devices) are co-located, the virtual meeting application may use other factors to identify co-located virtual meeting participants and/or co-located computing devices participating in the virtual meeting. For example, the virtual meeting application may identify the IP addresses of computing devices 102, 112, and 122, and determine that such IP addresses are indicative of users A1, A2, and A3 being co-located, and/or otherwise receive location data from a computing device indicating its current location. As another example, the virtual meeting application may identify co-located attendees and their devices, based on any other unique identifiers to detect potential co-location, or based manually setting or specifying co-located devices through a user interface. As another example, the virtual meeting application may receive user input indicating a selection, or otherwise specifying, co-located devices (e.g., by a device designated as host of the virtual meeting). In some embodiments, at least one of the co-located devices may be turned off, and/or its microphone may be muted or its output speaker volume may be muted, and thus may or may not be identified as a co-located device.

In some embodiments, the virtual meeting application may treat each group of co-located computing devices at a particular location (e.g., co-located computing devices 102, 112, and 122 at first location 101) as a first group having multiple input (e.g., microphones) and output (e.g., speakers) channels, and may treat second co-located computing devices 132 and 142 at second location 103 as a second group having multiple input (e.g., microphones) and output (e.g., speakers) channels. In some embodiments, the virtual meeting application may collectively process all the audio input streams (e.g., 162, 164, and 166) from a particular group (e.g., detected by one or more of microphones 104, 114, and 124 of computing devices 102, 112, and 122 from the group co-located at location 101) together to generate intermediate audio streams 174, 176, and/or 178. For example, intermediate audio stream 174 may be generated such that the only voice included in intermediate audio stream 174 is a voice of user A1; intermediate audio stream 176 may be generated such that the only voice included in intermediate audio stream 176 is a voice of user A2; and intermediate audio stream 178 may be generated such that the only voice included in intermediate audio stream 178 is a voice of user A3. Such intermediate audio streams 174, 176, and/or 178 may be used to generate one or more audio output streams (e.g., audio output streams 190, 192, and/or 194) to be delivered to other participants (e.g., participants B1 and B2 at location 103, and participant C at location 105).

Similarly, the virtual meeting application may collectively process all the audio input streams 168 and 170 from a particular group (e.g., detected by one or more of microphones 134 and 144 of computing devices 132 and 142 from the group co-located at location 103) together to generate intermediate audio streams 180, 182, and/or 183. For example, intermediate audio stream 180 may be generated such that the only voice included in intermediate audio stream 180 is a voice of user B1; intermediate audio stream 182 may be generated such that the only voice included in intermediate audio stream 182 is a voice of user B2; and intermediate audio stream 183 may be generated such that the only voice included in intermediate audio stream 183 is a voice of user C. Such intermediate audio streams 180, 182, and/or 183 may be used to generate one or more audio output streams (e.g., audio output streams 184, 186, 188 and/or 194) to be delivered to other virtual meeting participants (e.g., participants A1, A2, and A3 at location 103, and participant C at location 105). The virtual meeting application may simultaneously or concurrently deliver audio signals from other participants using the co-located multi-output speakers (e.g., output speakers 106, 116, and/or 126 at location 101) in such group, to provide audio data of the virtual meeting for the participants in this group.

In some embodiments, the virtual meeting application may modify the received audio input streams (e.g., 162, 164, 166, 168, 170, and/or 172) to generate intermediate audio streams (e.g., 174, 176, 178, 180, 182 and/or 183) for each of its attendees (e.g., at server 210) using the audio streams collected from each group, and the co-located output speakers can render different audio outputs (e.g., different voice combinations of remote participants, or only the voice of a single remote participant) for different remote attendees, to provide a dynamic and adaptive approach to managing audio in co-located settings.

In some embodiments, a method for managing audio streams in a video conference is provided, the method comprising identifying and monitoring a plurality of audio input devices and audio output devices that are connected to a video conferencing server; receiving, at a video conferencing server, multiple audio input streams from said plurality of audio input devices; categorizing said audio input devices and said audio output devices into several groups, wherein each group comprises a subset of the audio input devices and a subset of the audio output devices such that any audio input device within a particular group can capture audio output from any audio output device within the same group but cannot capture audio output from an audio output device outside of that group; and for each identified group: analyzing and processing the received audio input streams corresponding to that group; generating a first set of audio output streams intended for other groups participating in the video conference; receiving a plurality of the said first set of audio output streams from the other groups; generating a second set of audio output streams, wherein each stream in the second set is tailored for a specific audio output device within the group; and synchronously delivering each audio stream from the second set of audio output streams to its corresponding audio output device.

In some embodiments, the virtual meeting application collects all audio input streams from each computing device participating in the virtual meeting (e.g., computing devices 102, 112, 122, 132, 142, and/or 152), and such audio input streams may be buffered temporarily for synchronization purposes. The audio input streams from computing devices within a co-located group may be grouped together, and thus each co-located group may be associated with a set of audio input streams (e.g., on a per-participant basis). The virtual meeting application may process the collected audio input streams from the co-located group to produce a single optimized audio stream for each attendee in that group. For example, as shown at audio input processing block 108 of FIG. 1, based on such processing, the virtual meeting application may identify and/or generate intermediate audio stream 174, which may correspond to the voice of user A1 (without voices of users A2 and A3) and may be detected via microphone 104 of computing device 102 (and/or other microphones at location 101); intermediate audio stream 176, which may correspond to the voice of user A2 (without voices of users A1 and A3) and may be detected via microphone 114 of computing device 102 (or via microphone 104 or 124, such as if microphone 114 is muted); intermediate audio stream 178, which may correspond to the voice of user A3 (without voices of users A1 and A2) and may be detected via microphone 124 of computing device 122 (and/or other microphones at location 101). As another example, as shown at audio input processing block 110 of FIG. 1, based on such processing, the virtual meeting application may identify and/or generate intermediate audio stream 180 (e.g., based on audio input streams 168 and/or 170), which may correspond to the voice of user B1 (without the voice of user B2) and may be detected via microphone 134 of computing device 132 (and/or microphone 144 of computing device 142); and intermediate audio stream 182, which may correspond to the voice of user B2 (without the voice of user B1) and may be detected via microphone 144 of computing device 142 (and/or microphone 134 of computing device 132). As yet another example, the virtual meeting application may generate, at audio input processing block 118, intermediate audio stream 183, which may correspond to the voice of user C and may be detected via microphone 154 of computing device 152. In some embodiments, since user C is not co-located with any other users, intermediate audio stream 183 may be the same as audio input stream 172.

In some embodiments, processing of the collected audio streams from the co-located group to produce respective optimized audio input streams and/or respective optimized audio output streams for each attendee in a particular co-located group comprises monitoring the microphone signals from all devices participating in the virtual meeting, or monitoring the microphone signals from all devices at the particular co-located group, and analyzing such signals on the client and/or server to determine whether any of such signals contains acoustic feedback or echo. For example, the virtual meeting application may employ heuristic-based techniques, e.g., frequency analysis, such as, for example, FFT analysis, to detect whether a sudden spike in the magnitude of an audio signal has occurred, which may be indicative of feedback. Fourier analysis converts a signal from its original domain (often time or space) to a representation in the frequency domain and vice versa. The discrete Fourier transform (DFT) is obtained by decomposing a sequence of values into components of different frequencies. As another example, the virtual meeting application may determine whether the same audio signature is present in a given audio signal, indicating echo (e.g., if a microphone is picking up a person speaking, as well as an output speaker playing back the received audio of that person speaking). In some embodiments, upon detecting audio indicative of feedback or echo in a portion of an audio stream (e.g., an audio input stream and/or an intermediate audio stream), the virtual meeting application may block or mute such portion of the audio stream, or otherwise filter out such portion of audio from the audio stream.

In some embodiments, the virtual meeting application may implement artificial intelligence (AI) techniques, e.g., one or more machine learning models (e.g., a neural network), which may be trained to output a prediction of the probability of a potential feedback problem based on input data (e.g., characteristics of audio signals), to enable the virtual meeting application to address such feedback issue before it occurs. For example, the system may collect historical data about particular settings, particular computing devices (e.g., microphones), and/or particular users, when feedback or echo was (or was not) detected. Such historical data may be used to train the machine learning model to learn patterns indicative of a potential feedback or echo issue, which may be applied to new data collected during a virtual meeting, that the machine learning model has not been trained on, to identify potential feedback or echo issues.

In some embodiments, the processing of the collected audio streams from the co-located group to produce respective optimized audio output streams for each attendee in a particular co-located group comprises synchronizing the audio streams (e.g., the audio streams from a particular co-located group) to minimize time lag between the audio streams. In some embodiments, the processing of the collected audio streams from the co-located group to produce respective optimized output audio streams for each attendee in a particular co-located group comprises filtering the audio to remove any sound input determined to have originated from output speakers (e.g., 106, 116, or 126) of computing devices (e.g., 102, 112, 122) in a particular co-located group (e.g., at location 101). In some embodiments, if the virtual meeting application determines that at least two co-located users are speaking at the same time during the virtual meeting, the virtual meeting application may cause at least one voice of one of such users to be delayed, e.g., to assist other users in comprehending the co-located user's commentary.

In some embodiments, in generating audio output streams 190, 192, and/or 194 (e.g., at audio output processing blocks 128 and/or 130, based on intermediate audio streams 174, 176, and 178 and/or based on audio input streams 162, 164, and 166) the virtual meeting application may filter out audio determined to have been output by one or more of output speaker 106, output speaker 116, or output speaker 126. For example, characteristics (and/or an audio signature) of audio received by microphone 104, 114, or 124 of computing devices 102, 112, and 122 co-located at location 101 may be compared to characteristics of audio (and/or an audio signature) being output (or that is to be output) at co-located output speakers 106, 116, or 126. Based on such comparison, matching portions of audio (e.g., audio input detected at location 101 that is also being output, or is to be output, at location 101) may be filtered out of audio input streams 162, 164, and 166 (and/or filtered out of intermediate audio streams 174, 176, and 178), to help minimize feedback and echo at location 103 and/or 105. In some embodiments, portions may be deemed to match if a similarity score, determined based on the comparison, exceeds a certain threshold.

In some embodiments, in generating audio output streams 184, 186, 188, and/or 194 (e.g., at audio output processing blocks 120 and/or 130, based on intermediate audio streams 180, 182 and/or 183, and/or based on audio input streams 168, 170, and 172) the virtual meeting application may filter out audio determined to have been output by one or more of co-located output speakers 136 and 146. For example, characteristics (and/or an audio signature) of audio received by microphone 134 or 144 of computing devices 132 and 142 co-located at location 103 may be compared to characteristics of audio (and/or an audio signature) being output (or that is to be output) at output speakers 136 and 146. Based on such comparison, matching portions of audio (e.g., audio input detected at location 103 that is also being output, or is to be output, at location 103) may be filtered out of audio output streams 184, 186, 188 and/or 194 (and/or filtered out of intermediate audio streams 174,), to help minimize feedback and echo at location 101 and/or 105.

In some embodiments, the processing of the collected audio streams from the co-located group to produce respective optimized audio output streams for each attendee in a particular co-located group comprises filtering the audio to remove redundant or duplicated audio from within the co-located group, to prevent echo or feedback, e.g., at output speakers at a particular location having co-located virtual meeting participants. For example, to identify redundant portions of the audio input streams 162, 164, and 166 collected at location 101, the virtual meeting application may compare detected audio received by microphone 104 of computing device 102 (and/or an associated generated audio signature) with detected audio received by microphone 124 of computing device 122, at location 101 (and/or an associated generated audio signature), and identify portions that match (e.g., have a similarity score above a certain threshold).

In some embodiments, the virtual meeting application may be configured to separate the collected audio input streams to a set of individual intermediate audio streams (e.g., 174, 176, and 178 at location 101, and 180 and 182 at location 103), one for each attendee based on voice recognition. In some embodiments, the virtual meeting application may be configured to enhance the clarity of the received audio input streams (e.g., 162, 164, and 166 from location 101) using noise-reduction techniques. Such per-user audio input streams 174, 176, and 178, may be further processed (at audio output processing blocks 128 and 130) to generate audio output streams 190, 192, and/or 194, and audio output streams 190 and 192 may be output at, at location 103 (e.g., at which co-located attendees B1 and B2 are located) and audio output stream 194 may be output at location 105 (e.g., at which attendee C is the sole virtual meeting participant).

As another example, to identify redundant portions of the collected audio input streams 162, 164, and 166 at location 101 of FIG. 1, the virtual meeting application may use voice recognition and/or speaking user recognition to identify a voice of user A1, a voice of user A2, and/or a voice of user A3, in the collected audio input streams, and may generate intermediate audio stream 174 based at least in part on extracting portions of the audio input stream corresponding to the voice of user A1 from such collected audio input streams and filtering out audio of voices of users A2 and A3. Likewise, the virtual meeting application may generate intermediate audio stream 176 based at least in part on extracting portions of the audio input stream corresponding to the voice of user A2 from such collected audio input streams and filtering out audio of voices of users A1 and A3. Similarly, virtual meeting application may generate intermediate audio stream 178 based at least in part on extracting portions of the audio input stream corresponding to the voice of user A3 from such collected audio input streams and filtering out audio of voices of users A1 and A2. In some embodiments, such voice recognition may be performed using heuristic-based techniques to identify a particular user's voice by comparing detected audio to audio clips and/or an audio signature and/or audio characteristics associated with a particular user (e.g., stored at a database). In some embodiments, such voice recognition may additionally or alternatively be performed using machine learning techniques.

Similar techniques may be employed to generate intermediate audio streams 180 and 182, by filtering out redundancies as between audio portions detected by microphone 134 or microphone 144 of computing devices 132 and 142, receptively. For example, the virtual meeting application may generate intermediate audio stream 180 based at least in part on extracting portions of the audio input stream corresponding to the voice of user B1 from such collected audio input streams and filtering out audio of a voice of user B2, and the virtual meeting application may generate intermediate audio stream 182 based at least in part on extracting portions of the audio input stream corresponding to the voice of user B2 from such collected audio input streams and filtering out audio of a voice of user B1.

In some embodiments, each of the audio output devices within a co-located group may be configured to output an audio output stream, e.g., sent from server 210 of FIG. 2. For example, with respect to location 101, based on generating audio output streams 184, 186, and 188 at audio output processing block 120, output speakers 106, 116, and 126 of computing devices 102, 112, and 122 of users A1, A2, and A3 may be configured to respectively output audio output streams 184, 186, and 188. As another example, with respect to location 103 having co-located computing devices 132 and 142, based on generating audio output streams 190 and 192 at audio output processing block 128, output speakers 136 and 146 of computing devices 132 and 142, respectively, may be configured to output audio output streams 190 and 192, respectively. As another example, with respect to location 105 having computing device 152, based on generating audio output stream 194 at audio output processing block 130, output speaker 156 of computing device 152 may be configured to output audio output stream 194. In some embodiments, co-located devices can be synchronized in playing the audio output streams (e.g., 184, 186, and/or 188 at location 101, and 190 and 192 at location 103), to enable audio to be played back in a manner that sounds singular and unduplicated to each participant in the co-located group.

In some embodiments, one or more of the audio output streams may be generated to correspond to any suitable combination of voices of remote users. For example, audio output stream 184, output at output speaker 106 of computing device 102 at location 101, may be configured to be a combination of voices of users B1, B2 and/or C (e.g., a combination of intermediate audio streams 180, 182, and/or 183). In some embodiments, each of co-located output speakers, e.g., 106, 116, and 126, may output different combination of voices of remotely located users. For example, output speakers 106, 116, and 126 may be used as a spatial audio system to render at least two voices (e.g., voices of users B1 and B2) at different locations within location 101 (e.g., a physical conference room in New York). In some embodiments, a combination of first and second intermediate audio streams (e.g., intermediate audio streams 180 and 182) used to generate the first audio output stream (e.g., audio output stream 184) is different from the combination of the first and second intermediate audio streams (e.g., intermediate audio streams 180 and 182) used to generate the second audio output stream (e.g., audio output stream 186 or 188).

In some embodiments, one or more of the audio output streams may be generated to correspond to a voice of a single remote user, without voices of any other remote users. For example, at location 101, the only voice present in audio output stream 184 may be the voice of user B1, the only voice present in audio output stream 186 may be the voice of user B2, and the only voice present in audio output stream 188 may be the voice of user C. As another example, if microphone 114 of computing device 112 of user A2 is muted at location 101, audio output streams 190 and 192 may be configured to correspond to intermediate audio stream 174 (e.g., with the only voice being the voice of user A1) and intermediate audio stream 178 (e.g., with the only voice being the voice of user A3), respectively. As another example, at location 103, one of audio output streams 190 or 192 may correspond to a voice of a single user (e.g., user A1) of another co-located location 101, and the other of audio output streams 190 or 192 may correspond to a combination of voices (e.g., users A2 and A3) at such another co-located location 101. As another example, at location 103, one of audio output streams 190 or 192 may correspond to a combination of the voices of two users (e.g., users A1 and A3) and the other of audio output streams 190 or 192 may correspond to a combination of the voices of two co-located users (e.g., users A2 and C) that are not co-located. As another example, if output speaker 136 of computing device 132 of user B1 is muted at location 103, the output of audio output streams 190 may be blocked or muted, and thus audio output stream 192 (e.g., the only other audio output stream being output at location 103) may be configured to output any suitable combination of the voices of users A1, A2, A3, and/or C. In some embodiments, audio output stream 194 output via computing device 152 may include a combination of various voices of virtual meeting participants (e.g., users A1, A2, A3, B1, and/or B2).

In some embodiments, one of co-located computing devices 102, 112, and 122 may be configured to output only the voice of user B1, whereas another of co-located computing devices 102, 112, and 122 may be configured to output only the voice of user B2, and yet another of co-located computing devices 102, 112, and 122 may be configured to output only the voice of user C. For example, co-located output speaker 106 of computing device 102 may be configured to prevent output of all voices of virtual meeting participants other than user B1 corresponding to audio output stream 184, and co-located computing device 112 may be configured to prevent output of all voices of virtual meeting participants other than user B2 corresponding to audio output stream 186.

In some embodiments, the virtual meeting application may be configured to cause the computing devices connected to the virtual meeting to render different individuals' (e.g., virtual meeting participants) audio streams differently. For example, the virtual meeting application may apply different weighting functions to various co-located computing devices, where each computing device (and/or user or user profile) may be associated with a particular weight. For example, if at audio output processing block 120, each of audio output stream 184, 186, and 188 is caused to correspond to intermediate audio streams 180, 182, and 183, respectively (e.g., each including only a single voice of a user), the weighting function may be used by the virtual meeting application to determine which of computing devices 102, 112, or 122 at location 101 should audio output stream 184, which computing device at location 101 should output audio output stream 186, and which computing device at location 101 should output audio output stream 188.

As another example, if user B1 and user A1 are determined to be the most important users in the meeting (e.g., based on status in their respective organizations or based on their knowledge of the subject matter at issue in the virtual meeting), or to have a past relationship (e.g., historically participating in other virtual meetings together, historically having a high frequency of electronic communications, or sharing more common interests as compared to the other users in the virtual meeting), the voice of user B1 (e.g., intermediate audio stream 180) in audio stream output 184 may be more heavily weighted and emphasized in relation to other voices in audio output stream 184, and/or voices other than the voice of user B1 may be excluded from audio output stream 184. Similarly, in such example, the voice of user A1 in audio output stream 190 may be more heavily weighted and emphasized in relation to other voices in audio output stream 190, and/or voices other than the voice of user A1 may be excluded from audio output stream 190.

In some embodiments, the weighting function may be used to specify a volume and/or gain (and/or other audio parameters) at which a particular audio stream should be output. For example, if audio output stream 192 corresponds to a combination of the voices of users A1 and A3 (e.g., intermediate audio streams 172 and 176), one of such users voices may be weighted more heavily and emphasized (e.g., played at a louder volume in relation to, and/or override) the other of such users voices, within audio output stream 192. In some embodiments, the virtual meeting application may permit a co-located user to specify which remote user's voice (or any suitable combination thereof and/or which voices should be emphasized) in the audio output stream output at the co-located user's computing device.

In some embodiments, the virtual meeting application may employ the different weighting functions for different users to manipulate parameters of the audio output streams based on identifies of participants. For example, a host of the virtual meeting may specify preferences of which user's voice should be output at which user's computing device at a second location, and/or which combination of user's voices and/or which user's voices should be emphasized, deemphasized, or muted in the audio output stream. In some embodiments, a virtual meeting participant (e.g., at a first location) that has not yet spoke (or whose turn it is to speak, e.g., determined based on user input or other analysis of metadata or subject matter of a particular point in the virtual meeting) may be provided with a preference as to which remote user (e.g., in a second location) should be provided with his or her voice via his or her audio output stream.

In some embodiments, the virtual meeting application may continuously monitor the audio environment, e.g., to detect that a new computing device (and/or a new microphone and/or a new output speaker) joins or leaves the virtual meeting. For example, if a new microphone or output speaker joins or an microphone or output speaker previously in a co-located group of computing devices in the virtual meeting exits the virtual meeting (or remains in the virtual meeting but leaves the co-located group, such as by walking out of the conference room with their laptop but remaining in the virtual meeting), the virtual meeting application may dynamically adjust processing to accommodate this change. For example, such a change may cause an audio output stream, previously being output by a computing device that has now left the virtual meeting, to be output at a different computing device within the co-located group. As another example, if an additional user's computing device joins co-located users B1 and B2 at location 103, and one of computing device 132 and 142 had been outputting at least two of audio output streams corresponding to voices of users A1, A2, and/or A3, the virtual meeting application may cause one of such at least two audio streams to be output at the additional user's computing device, instead of the computing device previously outputting multiple audio output streams. As another example, if an additional user's computing device joins the virtual meeting and is determined to be co-located with user C, such computing device's audio streams may be processed in accordance with the techniques described herein, e.g., separated into per-user audio streams, and may output per-user audio streams of other participants.

In some embodiments, once the virtual meeting ends, the virtual meeting application may cause the computing devices to be disconnected from the server (e.g., server 210 of FIG. 2), and may reset its processing parameters, in preparation for the next session. In some embodiments, audio processing may be centrally performed on the server, or some of the audio processing can be offloaded to the client side, to allow for consistent audio quality and a reduction in the processing load on individual client devices during the virtual meeting.

Figure 3B:
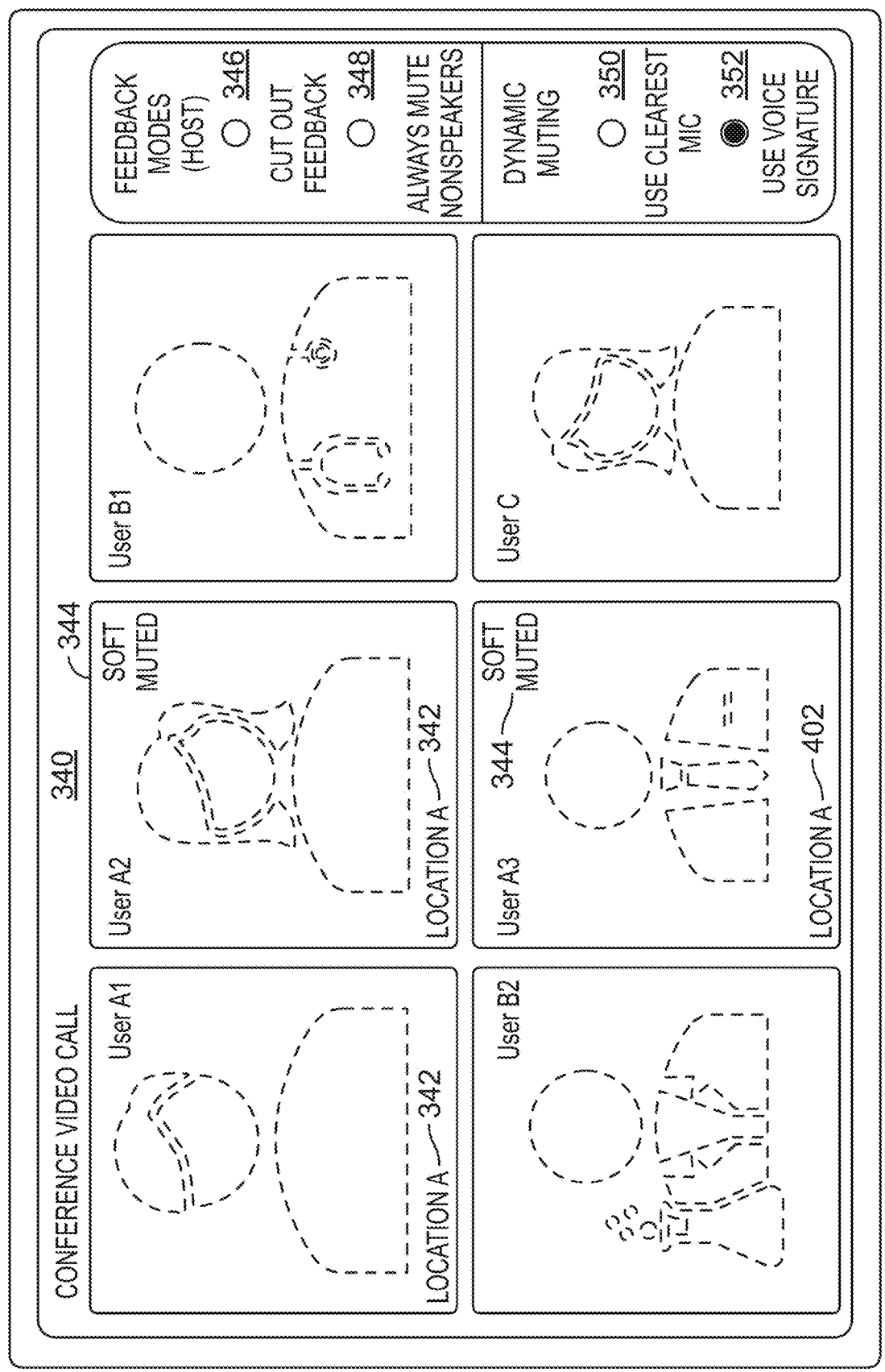
FIG. 3B shows an illustrative virtual meeting user interface, in accordance with some embodiments of this disclosure.

FIG. 3B shows an illustrative virtual meeting user interface 340, in accordance with some embodiments of this disclosure. As shown in FIG. 3B, user interface 340 may provide indications 342 to a user that certain users participating in the virtual meeting are co-located (e.g., at Location A). In some embodiments, the virtual meeting application may be configured to generate for display an indication of a username (e.g., user A1) associated with a user profile or user account of user A1 associated with the virtual meeting application (or an account or profile of the user with another service, e.g., a social network), and a digital representation of user A1. In some embodiments, an indication of usernames (e.g., users A1-C) associated with user profiles or user accounts of other users may be generated for display, along with a corresponding digital representation. In some embodiments, the virtual meeting application may generate for display an indication of a total duration of and/or an elapsed time of the virtual meeting. In some embodiments, the virtual meeting application may generate for display a selectable option to mute the user's own microphone and/or a selectable option turn off the user's own camera, a chat function, and any other suitable type of selectable options or information. In some embodiments, while a particular user is talking, an indication of which user is speaking may be output, e.g., at each of the co-located computing devices.

Figure 4:
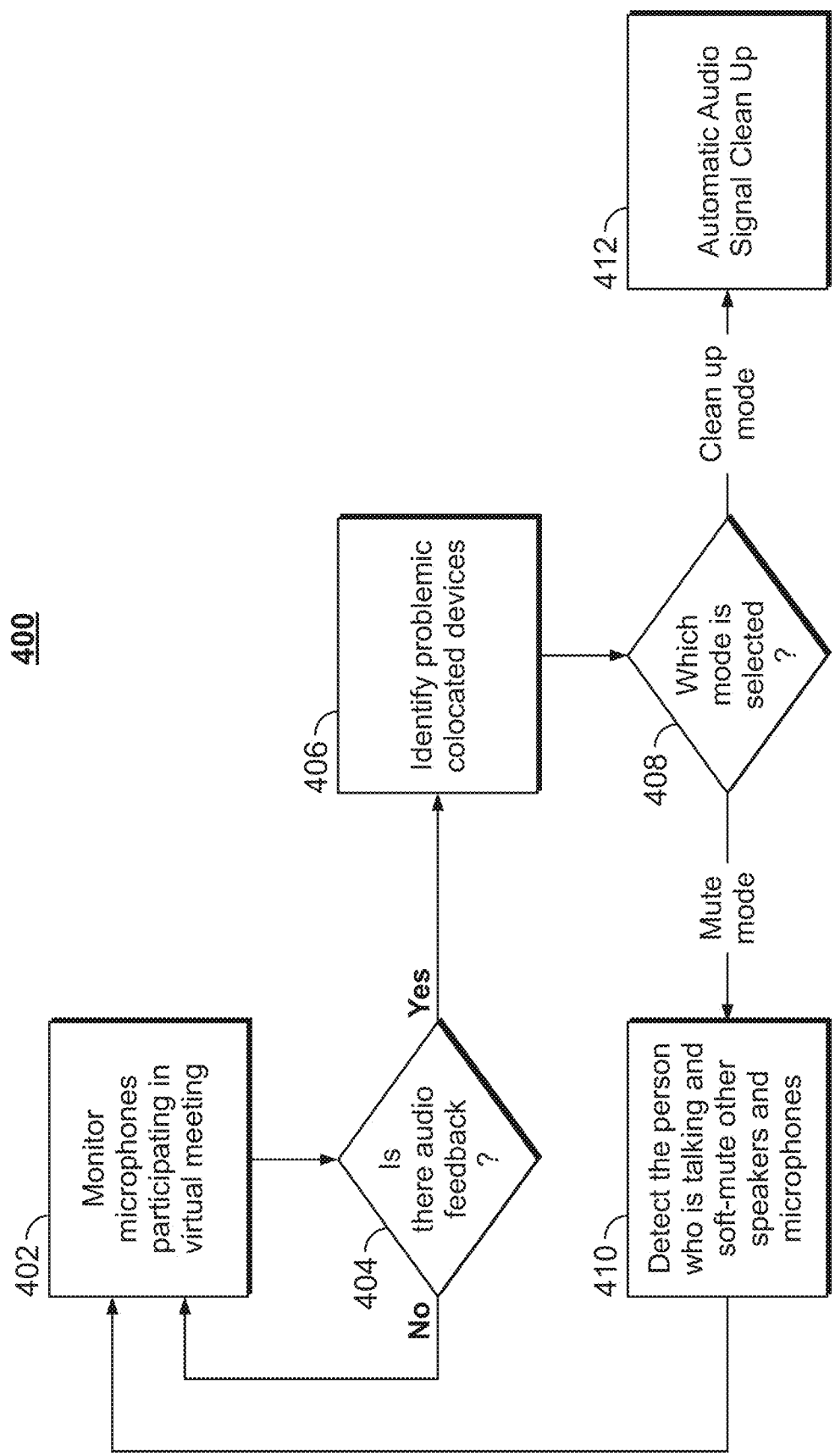
FIG. 4 is a flowchart of a detailed illustrative process for managing audio input data and audio output data of virtual meetings, in accordance with some embodiments of this disclosure.

FIG. 4 is a flowchart of a detailed illustrative process 400 for managing audio input data and audio output data of virtual meetings, in accordance with some embodiments of this disclosure. At 402, the virtual meeting application may monitor all microphones that are participating in the virtual meeting and that are turned on, e.g., not muted at the system level. At 404, if the virtual meeting application does not detect acoustic phenomena (e.g., echo or feedback), the virtual meeting application may continue monitoring and analyzing the signals from each of the microphones of computing devices connected to the virtual meeting. If there is audio feedback or echo detected in the signals from certain microphones, the virtual meeting application may (at 406) identify the co-located devices of such problematic microphones, such as, for example, by analyzing audio detected by each of the three devices and identify a common audio signature (e.g., to determine that users A1, A2, and A3 of FIG. 1 are co-located). For example, such common audio signature indicates users are in the same location picking up the same ambient sound. In some embodiments, the virtual meeting application may determine the IP addresses of the virtual meeting participant's computing devices. Alternatively, one or more of the devices may receive user input indicating a selection of co-located devices (e.g., by a device designated as "host" of the video conference).

In some embodiments, the virtual meeting application may select one or more microphones at the co-located location to detect virtual meeting audio based on any suitable criteria. For example, the virtual meeting application may select the microphone (e.g., from among co-located microphones 134 and 144 of computing devices 132 and 142, respectively, at location 103) having a signal with fewer distortions (e.g., the higher quality signal and/or the clearer signal, which may indicate which user is speaking). As another example, the virtual meeting application may select the microphone having a signal based on previously determined voice signature. For example, if microphone 134 is determined to be exhibiting user B1's audio signature (e.g., based on comparing an audio signature of currently detected audio to an audio signature stored for user B1), audio detected by microphone 134 of user B1 may be selected to generate intermediate audio stream 180 and/or an audio output stream 184 including the voice of user B1 (e.g., exclusively, or in combination with voices of other remotely located users, and/or in combination with other sounds).

In some embodiments, the one or more microphones of the co-located computing devices, other than the selected microphone(s), may be muted. For example, as shown in FIG. 3B at 344, from among users A1, A2, and A3 at location A (e.g., location 101 of FIG. 1), the microphones of user A2 and A3 (e.g., determined to have a lower quality audio signal, or determined to correspond to non-speaking users) may be soft-muted, whereas the microphone of user A1 may not be muted. That is, the microphones of user A2 and A3 may be muted at the software layer for the virtual meeting application, and to maintain dynamic mic switching capability, the microphones of user A2 and A3 may remain unmuted at the system level so that the acoustic signal picked up by these mics can potentially be analyzed. In some instances, the system may only soft-mute a microphone determined to be detecting signals having problematic audio distortions (e.g., echo or feedback). In some embodiments, such muting may be performed at 410, based on a determination that a mute mode has been entered at 408. In some embodiments, the virtual meeting application may be configured to, throughout the virtual meeting, continuously monitor which user is speaking during the virtual meeting, and may dynamically mute the microphone (and/or decline to output a particular audio output stream and/or decline to incorporate or cease incorporating a particular intermediate audio stream into one or more audio output streams) of a user (e.g., co-located with other users) that is determined not to be speaking, and may modify which microphones are active (and/or which audio output streams are output and/or which intermediate audio streams are used to generate certain audio output streams) based on whether a user is determined to be currently speaking.

In some embodiments, since the audio signal played by the output speaker from a particular computing device can be compensated when a microphone of the same device is used to collect audio signals as input, the virtual meeting application may cause, from among the co-located output speakers, only the output speaker of the particular computing device to be turned on, and may soft-mute (or otherwise mute) the other co-located output speakers. For example, while the soft-mute may be performed at the software layer for the virtual meeting application, any signals sent to soft-muted output speakers can still be analyzed by the virtual meeting application. In some embodiments, multiple other output speakers from co-located computing devices can be enabled if there is no indication of feedback or echo when they are turned on, and the virtual meeting application may be configured to synchronize the audio output from those output speakers so that the co-located users do not hear multiple copies of the audio signal, even if multiple output speakers are turned on.

In some embodiments, rather than soft-muting microphones, the virtual meeting application may "clean-up" (at 412) combined video conference audio (e.g., video conference audio generated by way of combining all audio from unmuted participants). Specifically, combined audio may be analyzed to detect and remove spikes, thereby removing feedback, and echoes may be similarly detected and removed. In some embodiments, user interface 340 may provide feedback mode options (e.g., for a host of the virtual meeting) to select option 346 to cut out feedback and/or option 348 to always mute non-speaking users (e.g., co-located non-speaking users). In some embodiments, user interface 340 may provide dynamic muting options 350 to use the clearest co-located microphone (e.g., and mute the other co-located microphones) and/or option 352 to use a voice signature associated with detected audio to determine which microphones to keep active and which to mute.

In some embodiments, the virtual meeting application may identify the spatial features of the room or other physical space having the multiple co-located participants by using video and/or camera input from each computer and constructing a video representation of the room and the location of each participant. This information can be combined with audio information and other information (e.g., IP address and/or any other suitable information) to further enhance the construction of the spatial features of a room or other physical space and the participants within it. In some embodiments, based at least in part on the determined location of the co-located output speakers at the particular location, spatial audio may be rendered to the users at the co-located location. In some embodiments, audio may be played on multiple co-located computing devices without causing any echo by buffering and realigning the audio to offset the specific latency of each audio production system. In some embodiments, a geographical location of a user (or a depicted location of user on a computing device's display during the virtual meeting) may be taken into account in determining which computing device such user's audio stream should be output. For example, relative to users A1, A2, and A3, spatial audio of audio output stream C of user C may be output from one or more co-located output speakers to give the sense that such audio output stream is coming from a 1 o'clock direction (relative to location 105) or 4 o'clock direction (relative to stream 183). In some embodiments, output speakers 106, 116, and 126 at location 101 may be used to render at least two voices (e.g., voices of users B1 and B2, present in intermediate audio streams 180 and 182, respectively) at two different locations (e.g., in a conference room at location 101).

In some embodiments, approximate locations of each output speaker and their specifications may be available (and/or may be estimated in an initialization step), to enable spatial audio to be rendered with the multiple output speakers, e.g., by assigning virtual positions within a room or physical space of the co-located users, to treat the microphones as a single microphone array from which a single audio input stream may be generated and/or identified (e.g., at audio input processing block 108 and/or 110), prior to separating out such audio input stream to per-participant intermediate audio streams. This may enable audio output of voices of each of the remote users (e.g., users B1, B2, and C) to sound as if though each is speaking from a distinct location. In some embodiments, based on the virtual microphone array (e.g., comprising each microphone from a co-located location) and virtual locations or positions of co-located users, gain and volume settings and/or any other suitable parameters or settings may be set, e.g., based on which virtual meeting participant is speaking. In some embodiments, the virtual positions or locations may be determined by mapping captured images of a particular location to a Cartesian coordinate plane (or any other suitable coordinate plane), and/or by using other sensor data. For example, a user's position may be recorded as X, Y coordinates on the plane, and may include a coordinate in the Z-axis, to identify a depth of each identified object in 3D space, based on images captured using 3D sensors and any other suitable depth-sensing technology. For example, the virtual meeting application may specify that an origin of the coordinate system is considered to be at one of the particular user's location at the co-located location, or at any other suitable portion of the location. In some embodiments, such coordinate system may include indications of locations of computing devices and/or other objects (e.g., an overhead projector, conference room table).

For example, a virtual meeting participant Alice may be located in a first location (e.g., in a first conference room in New York), and virtual meeting participants Bob and Charles may be co-located in a second location (e.g., a second conference room in California). Each of Bob and Charles may be assigned a virtual position within the first conference room such that their voices sound as if they are speaking from different locations, e.g., when Bob is talking, his voice sounds (from Alice's perspective) as if Bob is speaking from a distinct location as compared to when Charles is speaking. For example, the system may determine that at a large display at the front of the second conference room, Charles appears to the right of Bob, and thus the system may provide respective audio streams of Charles and Bob such that participants in the first conference room (e.g., Alice) perceive Charles's stream (or an audio output stream having a certain combination of Bob and Charles' voices) to be originating more from the right side of the display and/or first conference room, and Bob's stream or an audio output stream having a different combination of Bob and Charles' voices) to be originating more from the left side of the display and/or first conference room. Such aspects enable an improved user experience for those in the first conference room (e.g., Alice), by making it easier to detect who is talking, even if Bob and Charles sound similar and a user is not looking at the screen (e.g., if Alice's head is down taking notes or is otherwise not focused on the display at the front of the room).

In some embodiments, based on the virtual meeting generating multiple audio streams respectively corresponding to the virtual meeting participants, the virtual meeting application may provide an option to selectively mute certain users. For example, even if a user is in a same conference room as other users, such user's voice can be identified in each of the audio streams (e.g., A1, A2, and A3), and can be blocked (e.g., temporarily) from being output to other users at other virtual meeting locations.

In some embodiments, the environment depicted behind a user (e.g., as seen by that user and/or any suitable number of other users during the virtual meeting) may generally (e.g., as a default setting) correspond to an actual physical environment (e.g., an office inside an office building, a home office, a basement, a public setting, or any other suitable environment). In some embodiments, the virtual meeting application may provide for display a virtual background to completely replace or partially replace the physical background of a user. For example, the virtual meeting application may generate for display a virtual background behind user A1 corresponding to grass or plants.

In some embodiments, video data and audio data associated with the respective virtual meeting participants may be transmitted separately during the virtual meeting, along with a header or metadata (e.g., time stamps). Such header or metadata may enable synchronization of the audio and video data at the destination computing device, or audio and video data may be combined as a multimedia data stream. In some embodiments, a header or metadata may be appended to or otherwise associated with each per-user intermediate audio stream (and/or audio input stream), indicating a time when certain audio and/or video data is received, to allow for synchronization across streams delivered from (or to) a co-located location.

In some embodiments, any suitable audio or video compression and/or encoding techniques may be utilized. Such techniques may be employed prior to transmitting the audio and/or video components of the virtual meeting from a computing device to a server. In some embodiments, at least a portion of such video compression and/or encoding may be performed at one or more remote servers (e.g., an edge server and/or any other suitable server). In some embodiments, the receiving or rendering computing device may perform decoding of the video and/or audio data or multimedia data stream upon receipt, and/or at least a portion of the decoding may be performed remote from the receiving computing device. In some embodiments, the virtual meeting may be assigned a unique virtual meeting identifier. Depictions of the users participating in the virtual meeting may be arranged in any suitable format (e.g., to depict a currently speaking user only, to depict each conference participant including the user himself or herself, a subset of the conference participants, etc.).

Figure 5:
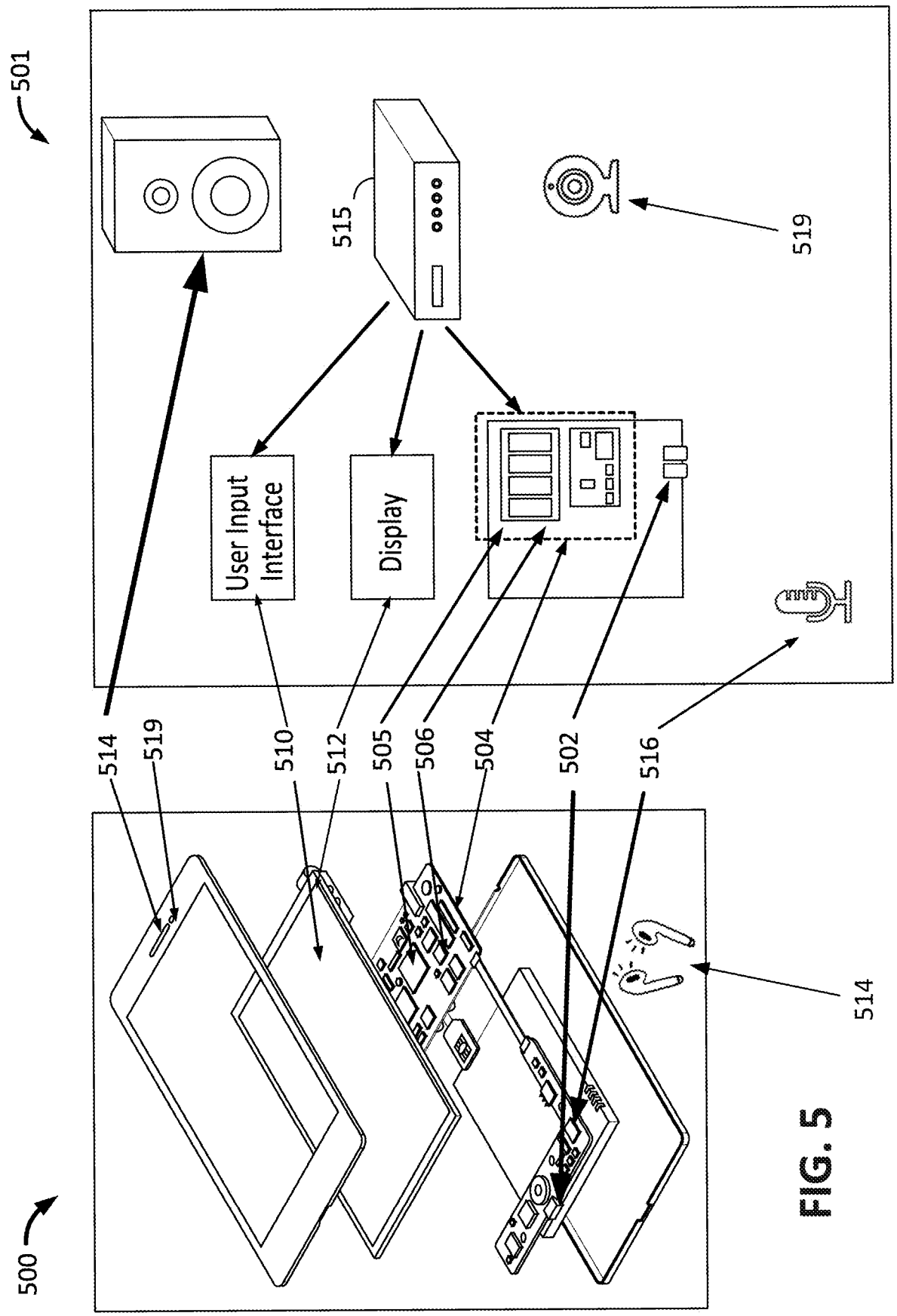
FIGS. 5-6 show illustrative devices and systems for managing audio input data and audio output data of virtual meetings, in accordance with some embodiments of this disclosure.

FIGS. 5-6 show illustrative devices and systems for managing audio input data and audio output data of virtual meetings, in accordance with some embodiments of this disclosure. FIG. 5 shows generalized embodiments of illustrative devices 500 and 501, which may correspond to, e.g., computing device 102, 112, 122, 132, 142, and 152 of FIG. 1. For example, device 500 may be a smartphone device, a tablet, a virtual reality or augmented reality device, or any other suitable device capable of participating in a virtual meeting over a communication network (e.g., network 609). In another example, device 501 may be a user television equipment system or device. Device 501 may include set-top box 515. Set-top box 515 may be communicatively connected to microphone 516 (which may correspond to microphone 104, 114, 124, 134, 144, and 154 of FIG. 1), audio output equipment (e.g., output speaker or headphones 514), and display 512. Output speaker 514 may correspond to output speaker 106, 116, 126, 136, 146, and 156 of FIG. 1. In some embodiments, microphone 516 may receive audio corresponding to a voice command related to recording content items. In some embodiments, display 512 may be a television display or a computer display. In some embodiments, set-top box 515 may be communicatively connected to user input interface 510. In some embodiments, user input interface 510 may be a remote control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 6. In some embodiments, device 500 may comprise any suitable number of sensors, as well as a GPS module (e.g., in communication with one or more servers and/or cell towers and/or satellites) to ascertain a location of device 500.

Each one of device 500 and device 501 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise or correspond to I/O circuitry 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 500), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the virtual meeting application stored in memory (e.g., storage 508). Specifically, control circuitry 504 may be instructed by the virtual meeting application to perform the functions discussed above and below. In some implementations, processing or actions performed by control circuitry 504 may be based on instructions received from the virtual meeting application.

In client/server-based embodiments, control circuitry 504 may include communications circuitry suitable for communicating with a storage management server (e.g., a cloud DVR, content database) or other networks or servers. The virtual meeting application may be a stand-alone application implemented on a device or a server. The virtual meeting application may be implemented as software or a set of executable instructions. The instructions for performing any of the embodiments discussed herein of the virtual meeting application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of device 500.

In some embodiments, the virtual meeting application may be a client/server application where only the client application resides on device 500 (e.g., computing device 112), and a server application resides on an external server (e.g., server 604 and/or an edge server). For example, the virtual meeting application may be implemented partially as a client application on control circuitry 504 of device 500 and partially on server 604 as a server application running on control circuitry 611. Server 604 may be a part of a local area network with one or more of device 500 or may be part of a cloud computing environment accessed via the internet. In a cloud computing environment, various types of computing services for performing searches on the internet or informational databases, providing access to content items, providing storage (e.g., for a database) or parsing data are provided by a collection of network-accessible computing and storage resources (e.g., server 604), referred to as "the cloud." When executed by control circuitry of server 604, the virtual meeting application may instruct control circuitry 504 or control circuitry 611 to perform processing tasks for the client device and facilitate the management of audio input data and audio output data of virtual meetings. In some embodiments, server 210 corresponds to server 604, which may be virtual meeting server.

Control circuitry 504 may include communications circuitry suitable for communicating with a cloud DVR, media content source, edge servers and devices, a table or database server, or other networks or servers The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of computing devices, or communication of computing devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as virtual meeting application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and down converting content into the preferred output format of device 500. Control circuitry 504 may also include digital-to-analog converter circuitry and analog-to-digital converter circuitry for converting between digital and analog signals. The tuning and encoding circuitry may be used by device 500, 501 to receive and to display, to play, or to record content. The tuning and encoding circuitry may also be used to receive content item data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, PIP functions, multiple-tuner recording, etc.). If storage 508 is provided as a separate device from device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of device 500 and device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and device 501 or may be stand-alone units. An audio component of videos and other content displayed on display 512 may be played through output speakers (or headphones) of audio output equipment 514. In some embodiments, audio may be distributed to a receiver (not shown), which processes and outputs the audio via output speakers of audio output equipment 514. In some embodiments, for example, control circuitry 504 is configured to provide audio cues to a user, or other audio feedback to a user, using output speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The virtual meeting application may be implemented using any suitable architecture. For example, it may be a stand-alone application wholly implemented on each one of device 500 and device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide storage management functionality and generate any of the displays discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may access and monitor network data, video data, audio data, processing data, content consumption data and user interaction data. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the virtual meeting application is a client/server-based application. Data for use by a thick or thin client implemented on each one of device 500 and device 501 may be retrieved on-demand by issuing requests to a server remote to each one of device 500 and device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via user input interface 510 and transmit those inputs to the remote server for processing and generating the corresponding displays. For example, device 500 may transmit a communication to the remote server indicating that an up/down button was selected via user input interface 510. The remote server may process instructions in accordance with that input and generate a display of the application corresponding to the input (e.g., a display that moves a cursor up/down). The generated display is then transmitted to device 500 for presentation to the user.

In some embodiments, the virtual meeting application may be downloaded and interpreted or otherwise run by an interpreter or virtual machine (run by control circuitry 504). In some embodiments, the virtual meeting application may be encoded in the ETV Binary Interchange Format (EBIF), received by control circuitry 504 as part of a suitable feed, and interpreted by a user agent running on control circuitry 504. For example, the virtual meeting application may be an EBIF application. In some embodiments, the virtual meeting application may be defined by a series of JAVA-based files that are received and run by a local virtual machine or other suitable middleware executed by control circuitry 504. In some of such embodiments (e.g., those employing MPEG-2 or other digital media encoding schemes), virtual meeting application may be, for example, encoded and transmitted in an MPEG-2 object carousel with the MPEG audio and video packets of a program.

FIG. 6 shows illustrative devices and systems for providing one or more portions of the media asset, in accordance with some embodiments of this disclosure. Computing devices 606, 607, 608, 610 (e.g., which may correspond to computing device 102, 112, 122, 132, 142, 152 of FIG. 1A) may be coupled to communication network 609. Communication network 609 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 609) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 609.

System 600 may comprise media content source 602, one or more virtual meeting servers 604, and one or more edge servers 616. In some embodiments, the virtual meeting application may be executed at one or more of control circuitry 611 of server 604 (and/or control circuitry of computing devices 606, 607, 608, 610 and/or an edge server).

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide content consumption data, user interaction data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise or correspond to I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Figure 7:
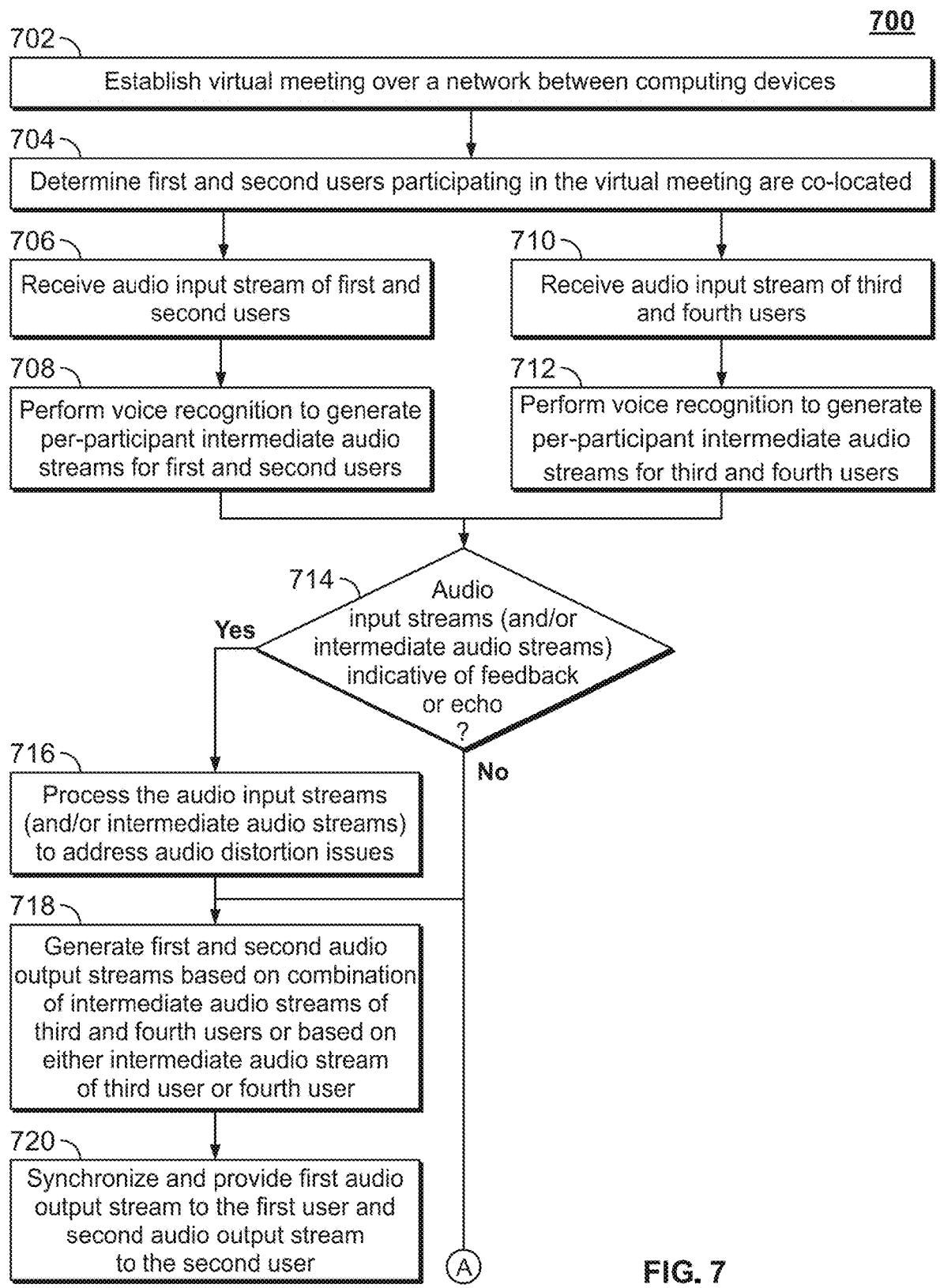
FIG. 7 is a flowchart of a detailed illustrative process for managing audio input data and audio output data of virtual meetings, in accordance with some embodiments of this disclosure.
Figure 7:
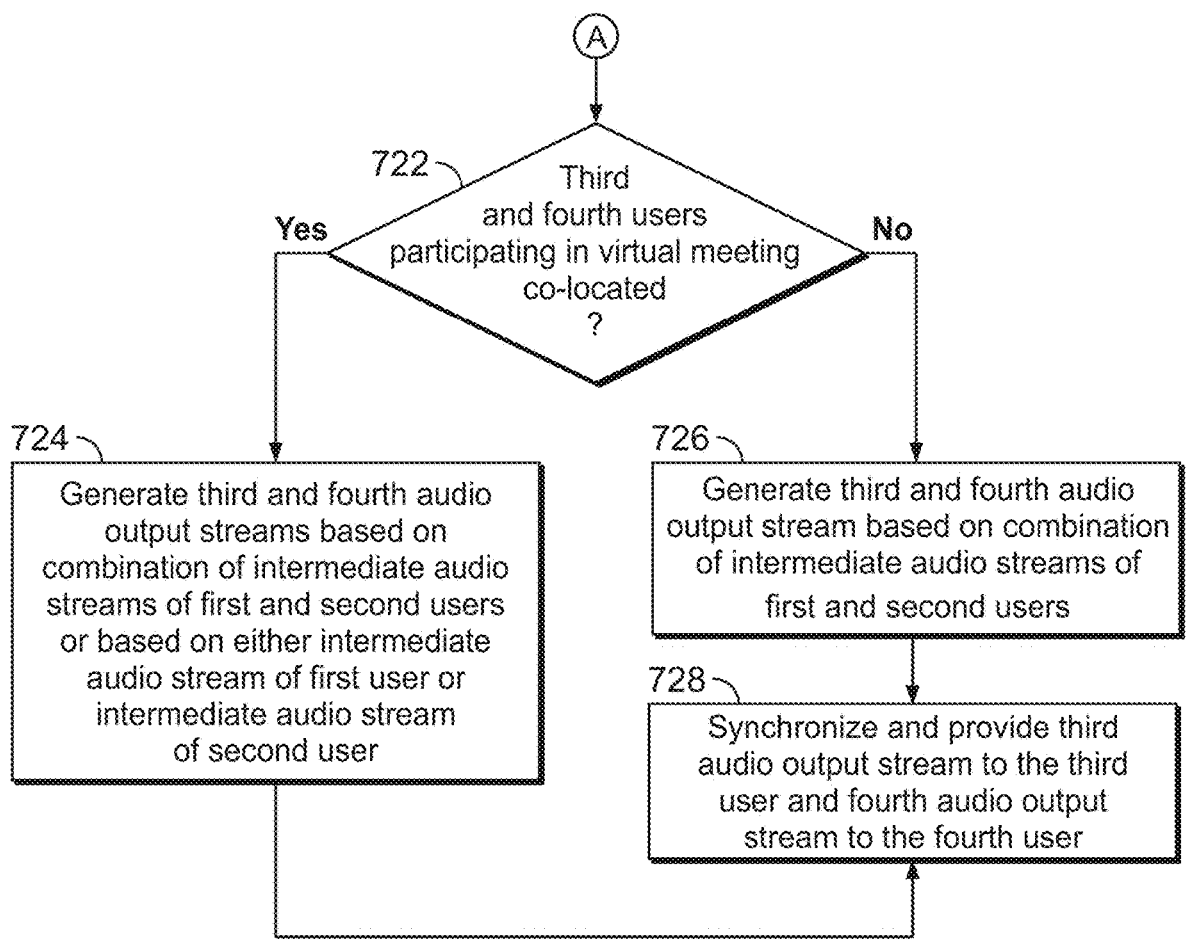

FIG. 7 is a flowchart of a detailed illustrative process 700 for managing audio input data and audio output data of virtual meetings, in accordance with some embodiments of this disclosure. In various embodiments, the individual steps of process 700 may be implemented by one or more components of the computing devices and systems of FIGS. 1-6 and may be performed in combination with any of the other processes and aspects described herein. Although the present disclosure may describe certain steps of process 700 (and of other processes described herein) as being implemented by certain components of the computing devices and systems of FIGS. 1-6, this is for purposes of illustration only. It should be understood that other components of the computing devices and systems of FIGS. 1-6 may implement those steps instead.

At 702, control circuitry (e.g., control circuitry 504 of FIG. 5 and/or control circuitry 611 of FIG. 6) may establish a virtual meeting over a network (e.g., communication network 609 of FIG. 6) between computing devices (e.g., computing devices 102, 112, 122, 132, 142, and 152 of users A1, A2, A3, B1, B2, and C, respectively, as shown in FIG. 1). In some embodiments, the number of client computing devices participating in the virtual meeting and the number of users participating in the virtual meeting may be equal. Alternatively, the number of client computing devices participating in the virtual meeting may be less than the number of users participating in the virtual meeting (e.g., if at least two of the users are using a same computing device to participate in the virtual meeting).

At 704, the control circuitry may determine that first and second users (e.g., users A1 and A2 of FIG. 1) participating in the virtual meeting are co-located. The control circuitry may make this determination based on input received from such users, based on location data associated with the computing devices of such users, based on comparing audio signatures of detected audio associated with such users (e.g., determined based on audio input streams 162, 164 and/or 166 from computing devices 102, 112, and/or 122 at location 101), based on IP addresses of the computing devices of such users, or based on any other suitable information, or any combination thereof.

At 706, the control circuitry may receive audio from the first and second users during the virtual meeting. For example, a virtual meeting server (e.g., server 210 of FIG. 2) may receive (e.g., via communications network 609 of FIG. 6) audio, e.g., audio input streams 162, 164, and/or 166) detected by microphones 104, 114, and/or 124 of computing devices 102, 112, and 122 of users A1, A2, and/or A3, respectively. In some embodiments, such audio may comprise voices of one or more users, and/or may comprise other ambient audio (e.g., a siren or a dog barking, which in some embodiments may be subsequently filtered out). For example, each of audio input streams 162, 164, and 166 of FIG. 1 may comprise voices of one or more of co-located users A1, A2, and/or A3 at a given time. In some embodiments, such audio may be received prior to 704, e.g., for use in determining whether users A1, A2, and A3 are co-located.

At 708, the control circuitry may perform voice recognition (and/or one or more of any other suitable computer-implemented techniques) to generate per-participant intermediate audio streams for the first and second users (e.g., users A1, A2 and/or A3). For example, with respect to location 101 of FIG. 1, the control circuitry may generate per-participant intermediate audio streams 174, 176, and 178, where audio of intermediate audio stream 174 contains the voice of user A1 but not the voices of other co-located users A2 and/or A3, and where audio of intermediate audio stream 176 contains the voice of user A2 but not the voices of other co-located users A1 and/or A3, and/or where intermediate audio stream 178 contains the voice of user A3 but not the voices of other co-located users A1 and/or A2.

In some embodiments, at 708, the control circuitry may detect the voices of one or more users (e.g., at microphones 104, 114, or 124 of FIG. 1) in the received audio input streams at 706, and determine that at least two distinct users are speaking over a certain period of time, and/or compare the received audio (or an audio signature derived from the received audio) to audio clips or other information stored in a database (e.g., database 605 of FIG. 6) that stores associations between certain users and/or their profiles and their voice characteristics. In some embodiments, the control circuitry may determine that a voice that is louder as detected at a particular microphone corresponds to the user of that computing device. In some embodiments, the control circuitry may extract one or more audio portions from the audio received at 706 as part of the generating audio input streams (and/or intermediate audio streams and/or audio output streams) for the co-located first and second users. In some embodiments, voices of particular users may be identified using heuristic-based techniques, machine learning techniques, or any other suitable computer-implemented techniques, or any suitable combination thereof.

At 710, the control circuitry may receive audio from the third and fourth users during the virtual meeting. For example, a virtual meeting server (e.g., server 210 of FIG. 2) may receive (e.g., via communications network 609 of FIG. 6) audio, e.g., audio input streams 168 and 170 detected by microphones 134 and 144 of computing devices 132 and 142, respectively, and/or audio input stream 172 from microphone 154 of computing device 152 of FIG. 1. In some embodiments, such audio may comprise voices of one or more users, and/or may comprise other ambient audio (e.g., a siren or a dog barking, which in some embodiments may be subsequently filtered out). For example, each of audio input streams 168 and 170 of FIG. 1 may comprise voices of one or more of co-located users B1 and B2 at a given time, and audio input stream 172 may comprise a voice of user C at a given time. In some embodiments, such audio may be received prior to 704, e.g., for use in determining whether users B1 and B2 are co-located.

At 712, the control circuitry may perform voice recognition (and/or one or more of any other suitable computer-implemented techniques) to generate per-participant intermediate audio streams for the third and fourth users (e.g., users B1, B2, and/or C). For example, with respect to location 103 of FIG. 1, the control circuitry may generate per-participant intermediate audio streams 180 and 182, where audio of intermediate audio stream 180 contains the voice of user B1 but not the voice of other co-located user B2, and where audio of intermediate audio stream 182 contains the voice of user B2 but not the voice of other co-located user B1. For user C at location 105, the control circuitry may generate intermediate audio output stream 184 comprising the voice of user C, where user C is not co-located with other users at a current time during the virtual meeting.

In some embodiments, at 712, the control circuitry may detect the voices of one or more users (e.g., at microphones 104, 114, or 124 of FIG. 1) in the received audio input streams at 710, and determine that at least two distinct users are speaking over a certain period of time, and/or compare the received audio (or an audio signature derived from the received audio) to audio clips or other information stored in a database (e.g., database 605 of FIG. 6) that stores associations between certain users and/or their profiles and their voice characteristics. In some embodiments, the control circuitry may determine that a voice that is louder as detected at a particular microphone corresponds to the user of that computing device. In some embodiments, the control circuitry may extract one or more audio portions from the audio received at 710 as part of the generating audio input streams (and/or intermediate audio streams and/or audio output streams) for the co-located third and fourth users. In some embodiments, voices of particular users may be identified using heuristic-based techniques, machine learning techniques, or any other suitable computer-implemented techniques, or any suitable combination thereof. In some embodiments, for a user that is not co-located with other users (e.g., user C), the control circuitry may determine that the voice detected at location 105 corresponds to the voice of user C based on an identifier of a user profile and/or computing device 152 of user C.

At 714, the control circuitry may determine whether one or more portions of the audio input streams (e.g., respective audio input streams 162, 164, 166, 168, 170, and/or 172 of user A1, A2, A3, B1, B2, and/or C) and/or whether one or more portions of the intermediate audio streams (e.g., respective intermediate audio streams 174, 176, 178, 180, 182, and/or 183 of user A1, A2, A3, B1, B2, and/or C) are indicative of having feedback or echo or other audio distortion issues. For example, at 714, the control circuitry may employ machine learning techniques or heuristic-based techniques or any other suitable computer-implemented techniques to identify portions of audio input streams (and/or intermediate audio streams) likely to correspond to feedback and/or echo. For example, frequency analysis, such as, for example, FFT analysis, to detect whether a sudden spike in the magnitude of an audio signal has occurred, which may be indicative of feedback. As another example, the control circuitry may determine whether the same audio signature is present in a given audio signal, indicating echo (e.g., if a microphone is picking up a person speaking as well as an output speaker playing back the received audio of that person speaking). As another example, the control circuitry may use a neural network, which may be trained to output a prediction of the probability of a potential feedback problem based on input data (e.g., characteristics of audio signals), to enable the control circuitry to address such feedback issue before it occurs. Upon an affirmative determination at 714, processing may proceed to 716; otherwise, processing may proceed to 722.

At 716, the control circuitry may process the audio input streams (and/or intermediate audio streams) to address audio distortion to obtain per-participant or per-user audio output streams. For example, the control circuitry, in response to determining that at least one of the audio input streams (and/or intermediate audio streams) comprises one or more attributes associated with audio feedback or audio echo, may perform filtering out of audio determined to have been output by an output speaker of a same device that received that same audio via its own microphone (e.g., if output speaker 106 of computing device 102 is determined to be about to output, or is outputting, an audio signal that substantially matches an audio signal having been recently detected via microphone 104 of computing device 102). As another example, the control circuitry, in response to determining that at least one of the audio input streams (and/or intermediate audio streams) comprises one or more attributes associated with audio feedback or audio echo, may perform filtering out of audio that is redundant as between co-located audio input streams (e.g., audio input streams 162 and 164 of FIG. 1).

In some embodiments, the processing at 714-718 may be performed on audio input streams received at the virtual meeting server, e.g., prior to separating audio input streams 162, 164, 166 of co-located users A1, A2, and A3 into per-participant intermediate audio streams, or after separating audio input streams 162, 164, 166 of co-located users A1, A2, and A3 into per-participant intermediate audio streams (e.g., intermediate audio streams 174, 176, and 178), or in parallel with (e.g., during performance of) the separation of audio input streams 162, 164, 166 of co-located users A1, A2, and A3 into per-participant intermediate audio streams.

In some embodiments, the processing at 714-718 may be performed on audio input streams received at the virtual meeting server, e.g., prior to separating audio input streams 168 and 170 of co-located users B1 and B2 into per-participant intermediate audio streams, or after separating audio input streams 168 and 170 of co-located users B1 and B2 into per-participant intermediate audio streams (e.g., intermediate audio streams 180 and 182), or in parallel with (e.g., during performance of) the separation of audio input streams 168 and 170 of co-located users B1 and B2 into per-participant intermediate audio streams.

At 718, the control may generate a first audio output stream (e.g., audio output stream 184 of FIG. 1) and a second audio output stream (e.g., audio output stream 186 or 188 of FIG. 1) based on combination of intermediate audio streams of third and fourth users (e.g., intermediate audio stream 180 and intermediate audio stream 182 of FIG. 1), or based on either solely the intermediate audio stream of the third user (e.g., intermediate audio stream 180 of FIG. 1) or based solely on the intermediate audio stream of the fourth user (e.g., intermediate audio stream 182 of FIG. 1). For example, the control circuitry may determine whether to generate the audio output streams based on the combination of the intermediate audio streams, or based solely on the individual intermediate audio streams, based on user preferences, based on user input, based on audio characteristics of the intermediate audio streams, based on a number of users at the location (e.g., location 101) of the co-located users, or based on any other suitable factor, or any combination thereof.

For example, if the control circuitry determines to generate the audio output streams based on the combination of the intermediate audio streams, the control circuitry may apply different weighting functions to various co-located computing devices, where each computing device (and/or user or user profile) may be associated with a particular weight, to determine one or more parameters (e.g., volume and/or gain) for voices of users in the audio output stream, and/or how much a voice of a particular user in the audio output stream should be emphasized in relation to other voices of other users, and/or whether certain users voices should be muted. In some embodiments, a combination of first and second intermediate audio streams (e.g., intermediate audio streams 180 and 182) used to generate the first audio output stream (e.g., audio output stream 184) is different from the combination of the first and second intermediate audio streams (e.g., intermediate audio streams 180 and 182) used to generate the second audio output stream (e.g., audio output stream 186 or 188), e.g., based on different weighting functions being applied to intermediate audio streams used to generate the audio output streams. In some embodiments, output speakers 106, 116, and 126 may be used as a spatial audio system to render at least two voices (e.g., voices of users B1 and B2) at different locations within location 101 (e.g., a physical conference room in New York).

Alternatively, in some embodiments, the control circuitry may be configured to (at 718) cause at least one of the audio output streams to cause the only voice in the audio output stream to correspond to a voice of one of the remotely located users. For example, the control circuitry may generate a first audio output stream 184 (or 186 or 188) containing the voice of the third user (e.g., user B1, B2, or C), and may prevent inclusion of any other voices of virtual meeting participants in such first audio output stream. As another example, the control circuitry may generate a second audio output stream 184 (e.g., one of 184, 186, 188 which is not the first audio output stream) containing the voice of the fourth user (e.g., a user from user B1, B2, or C that is not the third user), and may prevent inclusion of any other voices of virtual meeting participants in such first audio output stream.

At 720, the control circuitry (having determined that the first and second users are co-located) may synchronize and provide the first audio output stream (e.g., audio output stream 184) generated at 718 to a computing device (e.g., computing device 102 of FIG. 1) of the first user (e.g., user A1) and the second audio output stream (e.g., audio output stream 186 or 188) generated at 718 to a computing device (e.g., computing device 112 or 122 of FIG. 1) of the second user (e.g., user A2 or A3). For example, the voice of user B1 may be output by co-located output speaker 106 during the virtual meeting by way of audio output stream 184, and the voice of user B2 may be output by co-located output speaker 116 during the virtual meeting by way of audio output stream 186, to provide the sense of different remote users speaking from different locations within a co-located space (e.g., a conference room) and minimizing audio distortion issues for the co-located users. As another example, any suitable combination of the voices of remotely located users B1, B2, and/or C may be employed as audio output stream 184, and any suitable combination of the voices of remotely located users B1, B2, and/or C may be employed as audio output stream 186 or 188, where such combination used to generated the first audio output stream may be the same or different from the combination used to generated the second audio output stream.

In some embodiments, the control circuitry may be configured to selectively mute devices experiencing audio distortion issues (e.g., at location 101, mute output of an audio output stream of user B1, if such audio output stream is determined to be experiencing audio distortion issues, and/or at location 103, block the output of audio by output speaker 136). In some embodiments, the control circuitry may be configured to selectively mute devices of (or block intermediate audio streams corresponding to) non-speaking users (e.g., at location 101, mute output of audio output streams of non-speaking users such as user B2, such as if only user B1 is determined to be speaking, or decline to incorporate or cease incorporation of an intermediate audio stream in an audio output stream). In some embodiments, the control circuitry may be configured to, throughout the virtual meeting, continuously monitor which user is speaking during the virtual meeting, and may dynamically mute microphones (and/or decline to a output, or decline to incorporate (or cease incorporation) into an output, of an intermediate audio stream for a particular user) of a user (e.g., co-located with other users) that is determined not to be speaking, and may modify which microphones are active (and/or which per-participant streams are output) based on whether a user is determined to be currently speaking.

At 722, the control circuitry may determine whether the third and fourth users are co-located, in a similar manner as described at 704. For example, if the control circuitry determines that the third and fourth users are not co-located (e.g., if the third and fourth users correspond to user B1 and user C of FIG. 1), processing may proceed to 726. On the other hand, if the control circuitry determines that the third and fourth users are co-located (e.g., if the third and fourth users correspond to user B1 and user B2 of FIG. 1), processing may proceed to 724. In some embodiments, 720 may be performed prior to 714 (and/or prior to 710 and 712) to control the manner of processing based on whether the third and fourth users are co-located.

At 724, the control circuitry, having determined that the third and fourth users are co-located, may synchronize and provide a third audio output stream (e.g., audio output stream 190) to the third user (e.g., user B1) and a fourth audio output stream (e.g., audio output stream 192) to the fourth user (e.g., user B2). For example, such third audio output stream and fourth audio output stream may be generated in a similar manner as discussed in relation to 718 of FIG. 7, except using intermediate audio streams 174, 176, 178, and/or 183. For example, at 724, the control circuitry may generate such third audio output stream and fourth audio output stream based on a combination of intermediate audio streams 174, 176, 178, and/or 183, e.g., using any suitable weighting function or other techniques for combining the relevant intermediate audio streams. As another example, the control circuitry may generate such third audio output stream and fourth audio output stream based on a single intermediate audio stream from among intermediate audio streams 174, 176, 178, and/or 183. For example, the audio output streams may be generated such that the only voice data in each stream corresponds to a voice of a particular user (e.g., for co-located users A1 and A2, the voice of user A2 may be prevented from being included in audio output stream 190, and the voice of user A1 may be prevented from being included in audio output stream 192).

At 726, the control circuitry, having determined that the third and fourth users are not co-located (e.g., if the third and fourth users correspond to user B1 and user C of FIG. 1) may synchronize and provide combined audio output streams of the first and second users (e.g., users A1 and A3) to each of the third and fourth users (e.g., users B1 and C). For example, since such third and fourth users were determined to not be co-located, in order to provide each voice of the remote conference participants to the first and second users, a combined audio output stream of each of the remote users may be provided to the third and fourth users. In some embodiments, certain weighting functions may be applied to voices of different remotely located users, to enable such voices to be emphasized, deemphasized, and/or muted in the audio output streams provided to the third and fourth users. In some embodiments, even if a user is not co-located, the user may be permitted to configure multiple devices at his or her location to be treated as devices of co-located users, which may cause processing to proceed to 726, instead of 724, from 720.

In some embodiments, processing may be dynamically adjusted upon determining that a new user has joined the virtual meeting (or that a user has exited the virtual meeting). For example, if such joining or exiting of the virtual meeting creates a new co-located device group (or causes a formerly co-located participant group to no longer be co-located), processing by the control circuitry may be adjusted accordingly, e.g., in accordance with 724 for the newly formed co-located group, or in accordance with 726 for the now non-co-located group.

At 726, the control circuitry may synchronize and provide the third audio output stream (e.g., audio output stream 190 of FIG. 1) to the third user (e.g., user B1 of FIG. 1) and the fourth audio output stream (e.g., audio output stream 192 or 194) to the fourth user (e.g., user B2 or user C). For example, any suitable combination of the voices of the first and second users may be used to generate the third and fourth audio output streams. As another example, the voice of the first user (e.g., user A1) may only be output by co-located output speaker 136 during the virtual meeting, and the voice of the second user (e.g., user A2) may only be output by co-located output speaker 146 during the virtual meeting, to provide the sense of different remote users speaking from different locations within a co-located space (e.g., a conference room) and minimizing audio distortion issues for the co-located users.

While process 700 of FIG. 7 has been described in relation to voices of users during virtual meetings, it should be appreciated that the techniques described herein can be applied to other audio experiences provided over a communication network to multiple users as well. For example, the control circuitry (e.g., control circuitry 504 of FIG. 5 and/or control circuitry 611 of FIG. 6), which may be executing the virtual meeting application, may be configured to provide virtual concerts and/or virtual jam sessions to computing devices of a plurality of users located remotely from each other. Such virtual concerts and/or virtual jam sessions may include detected voices of users (e.g., singing or rapping), and/or may include other detected audio, e.g., of one or more instruments playing music. The control circuitry may be configured to generate per-instrument (and/or per voice) intermediate audio streams and/or audio output streams for such virtual concerts and/or virtual jam sessions. For example, during the virtual jam session or the virtual concert, a first and second user may be co-located at a first location, and a third and a fourth user may be co-located at a second location remote from the first location, where the first and second user may be playing a guitar and a drum, respectively, and the third and fourth user may be singing and playing a bass guitar, respectively.

In some embodiments, such first user may be associated with a first microphone and/or a first output speaker included in (or otherwise associated with) a computing device participating in the virtual concert or jam session, and such second user may be associated with a second microphone and/or a second output speaker included in (or otherwise associated with) a computing device participating in the virtual concert or jam session. For example, the detected audio at the first location (e.g., the guitar and drum musical audio produced by the first and second users playing their respective instruments) may be separated into per-instrument streams (e.g., by using heuristic-based and/or machine learning models and/or frequency analysis to identify and extract audio corresponding to the guitar, and to identify and extract audio corresponding to the drum). Such per-instrument streams may be processed to remove potential feedback and/or echo using the techniques described herein, and delivered to the remote co-located third and fourth users, respectively. For example, the third user may be provided with an audio output stream which includes the first user's audio playing the guitar (and which does not include the second user's audio playing the drum, or which includes a suitable (e.g., weighted) combination of the guitar and the drum), and the fourth user may be provided with an audio output stream which includes the second user's audio playing the drum (and which does not include the first user's audio playing the guitar, or which includes a suitable (e.g., weighted) combination of the guitar and the drum).

Similarly, such third user may be associated with a third microphone and/or a third output speaker included in (or otherwise associated with) a computing device participating in the virtual concert or jam session, and such fourth user may be associated with a fourth microphone and/or a fourth output speaker included in (or otherwise associated with) a computing device participating in the virtual concert or jam session. For example, audio (e.g., the singing of the third user and bass guitar musical audio produced by the fourth user) may be separated into per-voice/instrument streams (e.g., by using heuristic-based and/or machine learning models and/or frequency analysis to identify and extract audio corresponding to the signing, and to identify and extract audio corresponding to the bass guitar). Such per-instrument streams may be processed to remove potential feedback and/or echo using the techniques described herein, and delivered to the remote co-located first and second users, respectively. For example, the first user may be provided with an audio output stream which includes the third user's singing (and which does not include the fourth user's audio playing the bass guitar, or which includes a suitable (e.g., weighted) combination of the bass guitar and the singing), and the second user may be provided with an audio output stream which includes the fourth user's audio playing the bass guitar (and which does not include the third user's signing, or which includes a suitable (e.g., weighted) combination of the bass guitar and the singing).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
  determining that a first user and a second user, co-located at a particular location, are participating in a virtual meeting via a first computing device and second computing device, respectively, wherein the first computing device is associated with a first microphone and a first output speaker, the second computing device is associated with a second microphone and a second output speaker, and each of the first and second computing devices is connected via a network to a virtual meeting server providing the virtual meeting;

determining that a third user and fourth user, each located remotely from the particular location, are participating in the virtual meeting via one or more computing devices, wherein the one or more computing devices are associated with at least one third microphone and at least one third output speaker;

receiving, at the virtual meeting server, at least one audio input stream comprising voices of the third user and the fourth user, wherein the at least one audio input stream is detected during the virtual meeting using the at least one third microphone;

generating, at the virtual meeting server and based on the at least one audio input stream, a first intermediate audio stream corresponding to the detected voice of the third user and a second intermediate audio stream corresponding to the detected voice of the fourth user, wherein the first intermediate audio stream does not include the voice of the fourth user, and the second intermediate audio stream does not include the voice of the third user;

generating, based on the first intermediate audio stream and the second intermediate audio stream, a first audio output stream and a second audio output stream; and during the virtual meeting, synchronously causing the first audio output stream to be output by the first output speaker of the first computing device and the second audio output stream to be output by the second output speaker of the second computing device.

2. The method of claim 1, wherein generating the first audio output stream and the second audio output stream further comprises:
   combining the first and second intermediate audio streams to generate the first audio output stream; and
   combining the first and second intermediate audio streams to generate the second audio output stream, wherein the combination of the first and second intermediate audio streams used to generate the first audio output stream is different from the combination of the first and second intermediate audio streams used to generate the second audio output stream.

3. The method of claim 1, wherein generating the first audio output stream and the second audio output stream further comprises:
   preventing inclusion of the voice of the fourth user, corresponding to the second intermediate audio stream, in the first audio output stream; and
   preventing inclusion of the voice of the third user, corresponding to the first intermediate audio stream, in the second audio output stream.

4. The method of claim 1, wherein:
   the particular location is a first location;
   the third user and fourth user are co-located at a second location; and
   generating the first intermediate audio stream and the second intermediate audio stream further comprises:
      identifying one or more audio portions in the at least one audio input stream corresponding to a voice of the third user and identifying at least one audio portion in the at least one audio input stream corresponding to a voice of the fourth user; and
      extracting the one or more audio portions from the at least one audio input stream to generate the first intermediate audio stream, and extracting the at least one audio portion from the at least one audio input stream to generate the second intermediate audio stream.

5. The method of claim 1, wherein generating the first intermediate audio stream and the second intermediate audio stream further comprises:
   processing the at least one audio input stream to determine whether the at least one audio input stream comprises one or more attributes associated with audio feedback or audio echo; and
   in response to determining that the at least one audio input stream comprises one or more attributes associated with audio feedback or audio echo, processing the at least one audio input stream to perform at least one of filtering out audio determined to have been output by the at least one third output speaker or filtering out audio that is redundant as between first and second audio input streams of the at least one audio input stream.

6. The method of claim 1, wherein:
   the particular location is a first location;
   the third user and fourth user are co-located at a second location;
   the one or more computing devices at the second location comprise a third computing device associated with the third user and a fourth computing device associated with the fourth user, the third computing device comprising the third microphone and the fourth computing device comprising a fourth microphone; and
   the method further comprising:
      determining audio characteristics associated with the at least one audio input stream comprising the voices of the third user and the fourth user;
      determining, based on the audio characteristics, that audio signals being captured by the third microphone are of a higher quality than audio signals being captured by the fourth microphone; and
      causing the fourth microphone to be muted.

7. The method of claim 1, wherein:
   the particular location is a first location;
   the third user and fourth user are co-located at a second location;
   the one or more computing devices at the second location comprise a third computing device associated with the third user and a fourth computing device associated with the fourth user, the third computing device comprising the third microphone and a fourth computing device comprising a fourth microphone; and
   the method further comprising:
      determining whether a voice that is currently being detected at the third microphone and the fourth microphone belongs to the third user or the fourth user; and
      in response to determining that the voice that is currently being detected at the third microphone and the fourth microphone belongs to the third user, causing the fourth microphone to be muted.

8. The method of claim 1, wherein:
   the particular location is a first location;
   the third user and fourth user are co-located at a second location;
   the at least one third microphone is included in a particular computing device, located at the second location, to detect the voices of the third and fourth users at the second location; and
   the method further comprising:

modifying the output of at least one of the first audio output stream or the second audio output stream by ceasing use of the first intermediate audio stream, corresponding to the third user, in generating the first audio output stream or by ceasing use of the second intermediate audio stream, corresponding to the fourth user, in generating the second audio output stream.

9. The method of claim 1, wherein the method further comprises:
generating the first audio output stream and the second audio output stream further comprises:
preventing inclusion of the voice of the fourth user, corresponding to the second intermediate audio stream, in the first audio output stream;
preventing inclusion of the voice of the third user, corresponding to the first intermediate audio stream, in the second audio output stream; and
modifying the output of at least one of the first audio output stream or the second audio output stream by blocking output of at least one of the first audio output stream at the first computing device or the second audio output stream at the first computing device.

10. The method of claim 1, wherein:
the particular location is a first location;
the third user and fourth user are co-located at a second location;
the at least one audio input stream is a single audio input stream comprising the voices of the third user and the fourth user detected at the third microphone and a fourth microphone; and
the method further comprises:
detecting the single audio input stream based on treating the third microphone and the fourth microphone, co-located at the second location, as a microphone array; and
generating the first audio output stream and the second audio output stream based on the single audio input stream.

11. The method of claim 1, further comprising:
based on an identity of the third user, applying a first weighting function to the first audio output stream; and
based on an identity of the fourth user, applying a second weighting function to the second audio output stream;
wherein synchronously causing the first audio output stream to be output by the first output speaker of the first computing device and the second audio output stream to be output by the second output speaker of the second computing device further comprises modifying, based on the first weighting function applied to the first audio output stream and the second weighting function applied to the second audio output stream, one or more parameters of the first audio output stream to emphasize the output of the first audio output stream in relation to the output of the second audio output stream.

12. The method of claim 1, wherein generating the first audio output stream and the second audio output stream further comprises:
combining the first and second intermediate audio streams to generate the first audio output stream based on applying a first weighting function to the first intermediate audio stream and applying a second weighting function to the second intermediate audio stream; and
combining the first and second intermediate audio streams to generate the second audio output stream based on applying a third weighting function to the first intermediate audio stream and applying a fourth weighting function to the second intermediate audio stream.

13. The method of claim 1, further comprising:
determining, at the particular location, a location of the first output speaker and a location of the second output speaker;
wherein synchronously causing the first audio output stream to be output by the first output speaker of the first computing device and the second audio output stream to be output by the second output speaker of the second computing device further comprises rendering spatial audio based at least in part on the determined location of the first output speaker and the determined location of the second output speaker.

14. The method of claim 1, further comprising:
while causing the first audio output stream to be output by the first output speaker of the first computing device, providing an indication, at each of the first computing device and the second computing device, that the voice of the third user is being output; and
while causing the second audio output stream to be output by the second output speaker of the second computing device, providing an indication, at each of the first computing device and the second computing device, that the voice of the fourth user is being output.

15. The method of claim 1, wherein the first computing device comprises the first microphone and the first output speaker, and the second computing device comprises the second microphone and the second output speaker.

16. The method of claim 1, wherein:
the first output speaker is external to the first computing device and is coupled to the first computing device; or
the second output speaker is external to the second computing device and is coupled to the second computing device.

17. A system comprising:
control circuitry configured to:
determine that a first user and a second user, co-located at a particular location, are participating in a virtual meeting via a first computing device and second computing device, respectively, wherein the first computing device is associated with a first microphone and a first output speaker, the second computing device is associated with a second microphone and a second output speaker, and each of the first and second computing devices is connected via a network to a virtual meeting server providing the virtual meeting;
determine that a third user and fourth user, each located remotely from the particular location, are participating in the virtual meeting via one or more computing devices, wherein the one or more computing devices are associated with at least one third microphone and at least one third output speaker;
input/output circuitry configured to:
receive, at the virtual meeting server, at least one audio input stream comprising voices of the third user and the fourth user, wherein the at least one audio input stream is detected during the virtual meeting using the at least one third microphone;
generate, at the virtual meeting server and based on the at least one audio input stream, a first intermediate audio stream corresponding to the detected voice of the third user and a second intermediate audio stream corresponding to the detected voice of the fourth user, wherein the first intermediate audio stream does not include the voice of the fourth user, and the second intermediate audio stream does not include the voice of the third user;
generate, based on the first intermediate audio stream and the second intermediate audio stream, a first audio output stream and a second audio output stream; and
during the virtual meeting, synchronously cause the first audio output stream to be output by the first output speaker of the first computing device and the second audio output stream to be output by the second output speaker of the second computing device.

18. The system of claim 17, wherein the control circuitry is further configured to generate the first audio output stream and the second audio output stream by:
combining the first and second intermediate audio streams to generate the first audio output stream; and
combining the first and second intermediate audio streams to generate the second audio output stream, wherein the combination of the first and second intermediate audio streams used to generate the first audio output stream is different from the combination of the first and second intermediate audio streams used to generate the second audio output stream.

19. The system of claim 17, wherein the control circuitry is further configured to generate the first audio output stream and the second audio output stream by:
preventing inclusion of the voice of the fourth user, corresponding to the second intermediate audio stream, in the first audio output stream; and
preventing inclusion of the voice of the third user, corresponding to the first intermediate audio stream, in the second audio output stream.

20. The system of claim 17, wherein:
the particular location is a first location;
the third user and fourth user are co-located at a second location; and
the control circuitry is further configured to generate the first intermediate audio stream and the second intermediate audio stream by:
identifying one or more audio portions in the at least one audio input stream corresponding to a voice of the third user and identifying at least one audio portion in the at least one audio input stream corresponding to a voice of the fourth user; and
extracting the one or more audio portions from the at least one audio input stream to generate the first intermediate audio stream, and extracting the at least one audio portion from the at least one audio input stream to generate the second intermediate audio stream.

* * * * *